(12) United States Patent
Ohtake et al.

(10) Patent No.: US 7,586,682 B2
(45) Date of Patent: *Sep. 8, 2009

(54) ZOOM LENS AND IMAGING APPARATUS

(75) Inventors: Motoyuki Ohtake, Saitama (JP); Eiji Yano, Tokyo (JP); Ken Tanaka, Tokyo (JP); Takuya Tsutsumi, Tokyo (JP); Tatsuyuki Takahashi, Kanagawa (JP); Tsutomu Naitou, Kanagawa (JP)

(73) Assignee: Sony Corporation, Tokyo (JP)

( * ) Notice: Subject to any disclaimer, the term of this patent is extended or adjusted under 35 U.S.C. 154(b) by 381 days.

This patent is subject to a terminal disclaimer.

(21) Appl. No.: 11/580,161

(22) Filed: Oct. 13, 2006

(65) Prior Publication Data

US 2007/0097508 A1 May 3, 2007

(30) Foreign Application Priority Data

Oct. 27, 2005 (JP) .............................. 2005-312541

(51) Int. Cl.
*G02B 27/64* (2006.01)
(52) U.S. Cl. .................... 359/557; 359/363; 359/432; 359/676; 359/832; 396/55
(58) Field of Classification Search ........................ None
See application file for complete search history.

(56) References Cited

U.S. PATENT DOCUMENTS

| 5,182,671 A | 1/1993 | Kitagishi et al. |
| 5,315,435 A | 5/1994 | Horiuchi |
| 5,519,538 A | 5/1996 | Maruyama |
| 5,771,123 A | 6/1998 | Hamano |
| 7,411,731 B2 * | 8/2008 | Ohtake et al. ................ 359/557 |

OTHER PUBLICATIONS

U.S. Appl. No. 11/553,281, filed Oct. 26, 2006, Ohtake, et al.

* cited by examiner

*Primary Examiner*—Stephone B Allen
*Assistant Examiner*—Derek S Chapel
(74) *Attorney, Agent, or Firm*—Oblon, Spivak, McClelland, Maier & Neustadt, P.C.

(57) ABSTRACT

A zoom lens including a varifocal lens unit having a plurality of movable lens groups, and a prism disposed on an image side of the varifocal lens unit. The prism has an incident plane on which a light flux from the varifocal lens unit enters, and an exit plane from which the light flux is emitted toward an image plane, and is configured such that the incident plane or the exit plane or both planes can be inclined with respect to an optical axis, whereby a field of view is shifted by a predetermined amount by inclining the plane.

6 Claims, 26 Drawing Sheets

LATERAL ABERRATION

LATERAL ABERRATION

LATERAL ABERRATION

LATERAL ABERRATION

ZOOM LENS AND IMAGING APPARATUS

BACKGROUND OF THE INVENTION

1. Field of the Invention

The present invention relates to a zoom lens and an imaging apparatus, and more particular to a technique that enables an image shift by using a variable apex angle prism and helps to achieve reduction in size and enhancement of performance.

2. Description of the Related Art

In related art, as recording means for a camera, there has been known a method of converting an amount of light of a subject image formed on an imaging device surface into an electric output by means of a photosensor such as a charge coupled device (CCD), a complementary metal-oxide semiconductor (CMOS) or the like to record the converted electric output.

As microprocessing techniques have advanced in recent years, speeding up the central processing unit (CPU) and the enhancement of high-density-integration of the recording medium have been achieved, and it has been becoming possible to perform high speed processing of large size image data, which had not been able to handle until recently. Moreover, the enhancement of high-density-integration and the reduction in size have been attained for the light receiving element as well. As a result, recording of higher spatial frequency has been achieved, enabling the reduction in the whole size of a camera by the reduction in size of the light receiving element.

However, the light receiving area of individual photosensor has been reduced and the electric output thereof has been lowered owing to the enhancement of high-density-integration and the size reduction mentioned above, and an issue of increasing influences of noises due to lower electric output has been brought about. For addressing such an issue, the amount of light reaching the light receiving element has been increased by enlarging the aperture ratio of an optical system, or micro lens element (the so-called microlens array) has been disposed just before each element. The microlens array has restricted the exit pupil position of the lens system in compensation for introducing the light flux reaching a position between adjacent elements onto the elements. The reason of the restriction is that, if the exit pupil position of a lens system approaches the light receiving element, i.e. if the angle formed between the principal ray reaching the light receiving element and the optical axis becomes large, off-axis light fluxes advancing the peripheral portions of the image plane area forms large angles to the optical axis, and the off-axis light fluxes do not reach the light receiving element and causes the insufficiency of light.

As a zoom lens suitable for a video camera, a digital still camera and the like, each of which records a subject image by means of the photosensors, for example, a positive, negative, positive, positive four-group zoom lens has been known.

The positive, negative, positive, positive four-group zoom lens includes a first lens group having positive refractive power, a second lens group having negative refractive power, a third lens group having positive refractive power and a fourth lens group having positive refractive power, which are arranged in order from the object side. When the lens position arrangement of the four-group zoom lens changes from its wide angle end to its telephoto end, the first and the third lens groups are fixed in the optical axis direction, and a zoom operation is performed by the movement of the second lens group, and further the fourth lens group performs the operation of compensating the variation of the image plane position generated by the movement of the second lens group. A specific technique described in Japanese Patent Application Publication No. H06-337353 is known.

Now, because the angle of view at the telephoto end becomes narrow in a zoom lens having a large zoom ratio, such a lens has an issue such that even a minute camera shake causes a large movement of image.

As one of camera shake correction systems for correcting the movement of an image caused by the camera shake or the like, an optical camera shake correction system is known.

In the optical camera shake correction system, by combining a detection system for detecting a movement of a camera accompanying a camera shake caused by such as a shutter release, a control system for producing a displacement in a drive system based on a signal output from the detection system, the drive system for driving an optical system based on an output from the control system, and the optical system capable of shifting an image when the displacement is supplied from the drive system, the movement of an image caused by the movement of the camera can be cancelled and corrected by the movement of the image caused by the displacement of the optical system.

As the optical system to be used in the optical camera shake correction system, a lens shift system for shifting a part of a lens system in a direction perpendicular to an optical axis, a variable apex angle prism system for changing the apex angle of a prism disposed just before a lens system, and the like are known.

In such a lens shift system, there is an issue such that the number of lenses increases in order to suppress the change of optical performance that may occur at the time of shifting a predetermined lens, and it is difficult to reduce electric power consumption because the system requires to hold the lenses in the air (at a neutral position).

The variable apex angle prism system does not have the above-mentioned issue existing in the lens shift system.

The variable apex angle prism system may be classified into two categories, one in which a variable apex angle prism is disposed at a position nearest to the object side of the optical system, and the other in which a variable apex angle prism is disposed in the optical system.

As an example of disposing the variable apex angle prism at a position nearest to the object side, an optical system disclosed in Japanese Patent Application Publication No. S51-40942 exists.

In the case where the variable apex angle prism is disposed at a position nearest to the object side, there is a feature such that a change in the angle of view in relation to an amount of change in the apex angle does not depend on the focus distance of the zoom lens. When the movement of an image caused by a movement of a camera accompanying a camera shake or the like is corrected, the feature mentioned above has an advantage such that the apex angle can be controlled independently of the focus distance of the zoom lens. However, because the movement of the image is greatly caused in the telephoto state on the other hand, the technique disclosed in Japanese Patent Application Publication No. S51-40942 has an issue such that, in case of a large zoom ratio, stopping accuracy becomes extremely high in the telephoto state and improvement of the accuracy of the drive mechanism is required.

Moreover, because the variable apex angle prism is disposed on the object side of the first lens group having a large lens diameter, the diameter of the light flux entering the variable apex angle prism is large. As a result, there is an issue such that the variable apex angle prism itself becomes very large in size. Moreover, it is necessary to provide protection means such as disposing a protection glass in order that a hand of a user may not directly touch the variable apex angle prism. As a result, the miniaturization of the system has a limit.

On the other hand, as examples of having the variable apex angle prism in an optical system, those disclosed in Japanese Patent Application Publication Nos. S62-153816, H02-168223, H10-246855, H11-44845 and the like are known.

The optical system disclosed in Japanese Patent Application Publication No. S62-153816 places a variable apex angle prism at a part where light becomes a parallel light flux. The optical system disclosed in Japanese Patent Application Publication No. H02-168223 disposed a variable apex angle prism before the master lens group thereof. The optical systems disclosed in Japanese Patent Application Publication Nos. H10-246855 and H11-44845 severally dispose a variable apex angle prism in the neighborhood of an aperture diaphragm.

Because the on-axis light flux enters the variable apex angle prism as near to a parallel light in each of the optical systems disclosed in Japanese Patent Application Publication Nos. S62-153816, H02-168223, H10-246855, H11-44845, each of the optical systems has a feature such that the variation of an on-axis aberration, which occur when a prism angle is changed, can be suppressed.

SUMMARY OF THE INVENTION

A light flux which passes an optical system reaches an image plane while being refracted by lenses. A light flux toward the central portion of an image plane area reaches the image plane while being diverge or converge. Simultaneously, the principal ray toward the peripheral portion of the image plane area reaches the image plane while changing the angle formed with the optical axis.

Accordingly, when a variable apex angle prism is disposed in the optical system, it is possible to reduce a size of the system in comparison with the case where the variable apex angle prism is disposed on the object side to the first lens group. On the other hand, such a system has its issue such that a coma aberration may occur, a chromatic aberration may vary, or a trapezoid distortion may occur.

In particular, when the trapezoid distortion occurs, it is very difficult to correct image movement in the peripheral portion of the image plane area even if the image movement can be well corrected in the central portion of the image plane area, whereby the trapezoid distortion poses a critical issue. The trapezoid distortion tends to occur at a position where the principal ray forms a large angle with the optical axis when a light flux is not a parallel light.

It is desirable to address the issues mentioned above, and to provide a zoom lens that can be reduced lens diameter thereof and can suppress changes of various aberrations that may occur at the time of image shifting, and an imaging apparatus using such a zoom lens.

In an embodiment of the present invention, there is provided a zoom lens that includes a varifocal lens unit having a plurality of movable lens groups, and a prism disposed on an image side of the varifocal lens unit. The prism has an incident plane on which a light flux from the varifocal lens unit enters, and an exit plane from which the light flux is emitted toward an image plane, and is configured such that the incident plane or the exit plane or both planes can be inclined with respect to an optical axis. By inclining the plane, a field of view is shifted by a predetermined amount. The varifocal lens unit includes a front side lens group, an aperture diaphragm and a rear side lens group, which are arranged in order from an object side, and following conditional expressions (1) and (2) are satisfied: (1) $0.25 < \phi b/\phi < 0.8$, (2) $3 < Bf \cdot FNO/Ymax$, where $\phi b$ denotes refractive power of the rear side lens group in a wide angle end, $\phi$ denotes refractive power of whole zoom lens in the wide angle end, Bf denotes distance from the exit plane to the image plane of the prism in a telephoto end along the optical axis, FNO denotes F number in the telephoto end, and Ymax denotes maximum image height.

Accordingly, in the zoom lens of the present embodiment, inclining the plane of the prism can shift the field of view.

In an embodiment of the present invention, there is provided an imaging apparatus. The imaging apparatus includes: the zoom lens according to the previous embodiment; an imaging device adapted to convert an optical image formed by the zoom lens into an electric signal; camera shake detection means for detecting a movement of the imaging device; camera shake control means for calculating a movement correction angle for correcting an image blur caused by the movement of the imaging device detected by the camera shake detection means and sending a correction signal to set the zoom lens to a predetermined state in which a field of view is shifted by an amount corresponding to the movement correction angle; and a camera shake drive unit adapted to set the zoom lens into the predetermined state based on the correction signal.

When the imaging device in the imaging apparatus is moved in the present embodiment, the plane of the prism is inclined so as to shift the field of view by a predetermined amount for canceling the shift of the field of view caused by the shift of the imaging device.

According to the present embodiment, it is possible to achieve the miniaturization of the prism and the miniaturization of the optical system itself, by disposing the prism at a position nearest to the image side of the optical system. Furthermore, according to the present embodiment, the coma aberration or trapezoid distortion can be suppressed.

In an embodiment of the present invention, there is provided an imaging apparatus. The imaging apparatus includes: a zoom lens, an imaging device converting an optical image formed by the zoom lens into an electric signal, camera shake detection means for detecting a movement of the imaging device, camera shake control means for calculating a movement correction angle for correcting an image blur caused by the movement of the imaging device detected by the camera shake detection means and sending a correction signal for setting the zoom lens to a predetermined state in which a field of view is shifted by an amount corresponding to the movement correction angle, and a camera shake drive unit to set the zoom lens into the predetermined state based on the correction signal. The zoom lens includes a varifocal lens unit having a plurality of movable lens groups, and a prism disposed on an image side of the varifocal lens unit. The prism has an incident plane on which a light flux from the varifocal lens unit enters, and an exit plane from which the light flux is emitted toward an image plane, and is configured such that the incident plane or the exit plane or both planes can be inclined with respect to an optical axis. By inclining the plane, a field of view may be shifted by a predetermined amount. The varifocal lens unit includes a front side lens group, an aperture diaphragm and a rear side lens group, which are arranged in order from an object side, and following conditional expressions (1) and (2) are satisfied: (1) $0.25 < \phi b/\phi < 0.8$, (2) $3 < Bf \cdot FNO/Ymax$, where $\phi b$ denotes refractive power of the rear side lens group in a wide angle end, $\phi$ denotes refractive power of whole zoom lens in the wide angle end, Bf denotes a distance from the exit plane to the image plane of the prism in a telephoto end along the optical axis, FNO denotes an F number in the telephoto end, and Ymax denotes the maximum image height.

According to the present embodiment, by using the zoom lens of the embodiments, the imaging apparatus can be configured to be small in size, achieve image stabilization, and acquire a high quality image.

In an embodiment of the present invention, there is provided the zoom lens in which both of the front side lens group and the rear side lens group severally includes at least one lens group which is movable when a lens position arrangement changes from the wide angle end to the telephoto end, and a following conditional expression (3) is satisfied: (3) $0.4 < Ds/TL < 0.7$, where Ds denotes a distance from the aperture diaphragm to the image plane along the optical axis in the wide angle end, TL denotes a distance from a lens surface at a position nearest to the object side to the image plane of the zoom lens in the wide angle end along the optical axis. According to the present embodiment, the reduction of a lens diameter and the enhancement of performance can be balanced.

In an embodiment of the present invention, the prism includes a first parallel flat plate, liquid and a second parallel flat plate, which are located in order from the object side. An object side lens surface of the first parallel flat plate forms the incident plane, and an image side lens surface of the second parallel flat plate forms the exit plane. According to the present embodiment, a variable apex angle prism can be easily configured.

In an embodiment of the present invention, the prism includes a first lens and a second lens, which are located in order from the object side. An object side lens surface of the first lens is a plane forming the incident plane, and an image side lens surface of the second lens forms the exit plane. An image side lens surface of the first lens and an object side lens surface of the second lens are severally made of a curved surface having a same radius of curvature, the curved surfaces slidably contacted with each other directly or with a friction reducing medium put between them. According to the present embodiment, a variation of an apex angle per drive amount can be reduced, and more accurate control becomes possible.

DETAILED DESCRIPTION OF EMBODIMENTS

Figure 1:
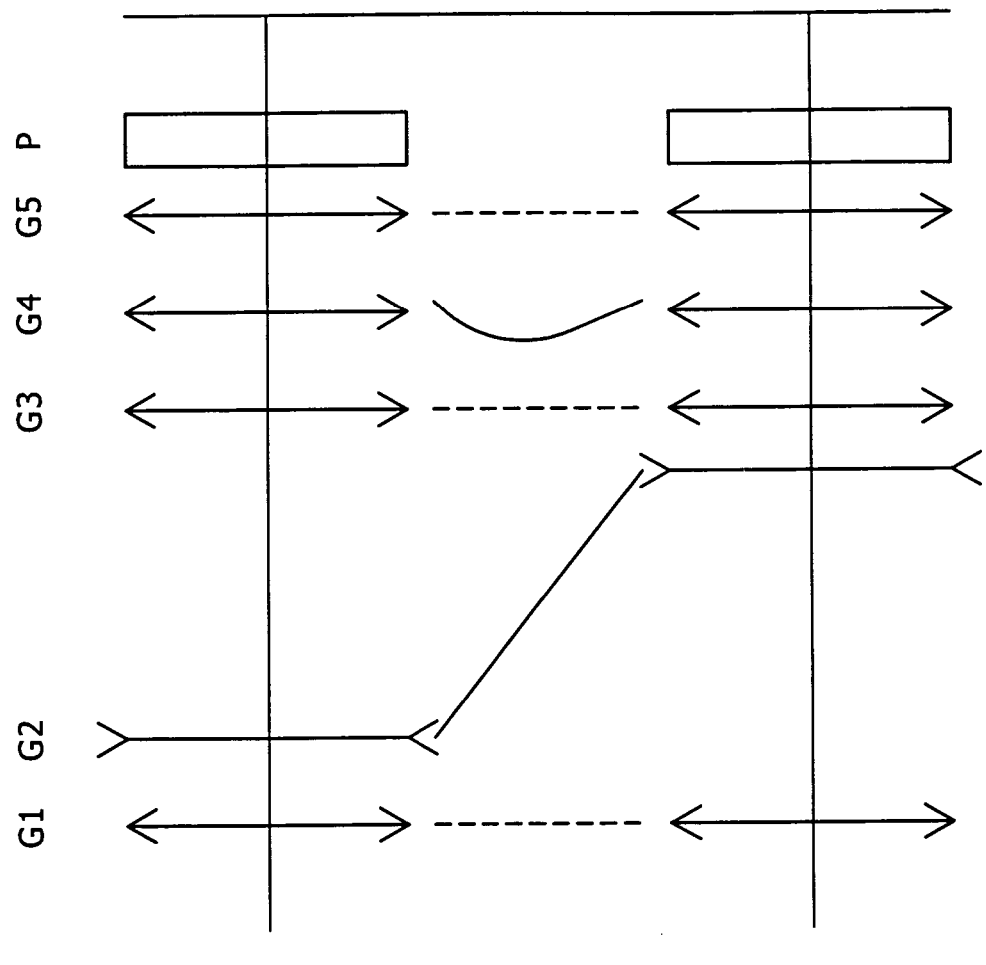
FIG. 1 is a diagram showing a refractive power arrangement of a first embodiment of the zoom lens of the present invention, movement of each lens group at the time of zooming, and a locus of movement.

In the following, a zoom lens and an imaging apparatus according to an embodiment of the present invention will be described with reference to the attached drawings.

The zoom lens of the present embodiment includes a varifocal lens unit having a plurality of movable lens groups, and a prism disposed on the image side of the varifocal lens unit. The prism has an incident plane into which a light flux from the varifocal lens unit enters, and an exit plane from which the light flux is emitted toward an image plane. The prism is configured such that the incident plane or the exit plane or both planes can be inclined to the optical axis, and, by inclining the plane that can be inclined, a field of view is shifted by a predetermined amount. The varifocal lens unit includes a front side lens group, an aperture diaphragm and a rear side lens group, which are arranged in order from the object side.

In the zoom lens of the present embodiment, the (variable apex angle) prism is disposed at a position nearest to the image side. The polarizing of a light flux radiated to the image plane is performed by changing the apex angle to shift the field of view.

First, it is possible to achieve the miniaturization of the prism by arranging the prism at the position nearest to the image side of the optical system as mentioned above, and the miniaturization of the optical system itself becomes possible.

Next, trapezoid distortion occurs when an angle between the principal ray passing through the prism and the optical axis becomes large. However, the zoom lens of the present embodiment satisfies the conditional expression (1) and sets the exit pupil position thereof at a position distant from the image plane, which is necessary and sufficient. Accordingly, the angle between the principal ray passing through the prism and the optical axis may be made to be parallel to the optical axis, thereby enabling to suppress the occurrence of the trapezoid distortion.

There is an issue such that a coma aberration is easy to occur because the variation of the apex angle becomes larger as a focus distance becomes longer when the prism is disposed at the position nearest to the image side of the zoom lens. In the zoom lens of the present embodiment, however, an image is greatly shifted by a small inclination angle by enlarging the distance from the prism to the image plane so as to avoid the need for large variation in the apex angle for suppressing the occurrence of the coma aberration.

As described above, when the angel θ of the apex angle becomes large, the coma aberration occurs. Accordingly, it is necessary to enlarge the distance (=L) from the prism to the image plane in order to suppress the angle θ of the apex angle necessary for acquiring a predetermined image shift amount. However, when the distance L becomes too large, the size of the optical system becomes larger accordingly.

The amount of the coma aberration depends on the F number (aperture ratio) of the zoom lens. When the F number is denoted by FNO, an incident maximum angle θF of an on-axis light flux into the incident plane can be calculated by a formula: $\theta F = \tan^{-1}(1/2 FNO)$ In this case, when a ratio θF/θ of the angle θ of the apex angle of the prism and the incident maximum angle θF becomes large, the amount of the coma aberration becomes large. Accordingly, the zoom lens of the present embodiment can suppress the amount of the coma aberration occurring at the time of changing the apex angle of the prism by making the ratio θF/θ small.

Figure 24:
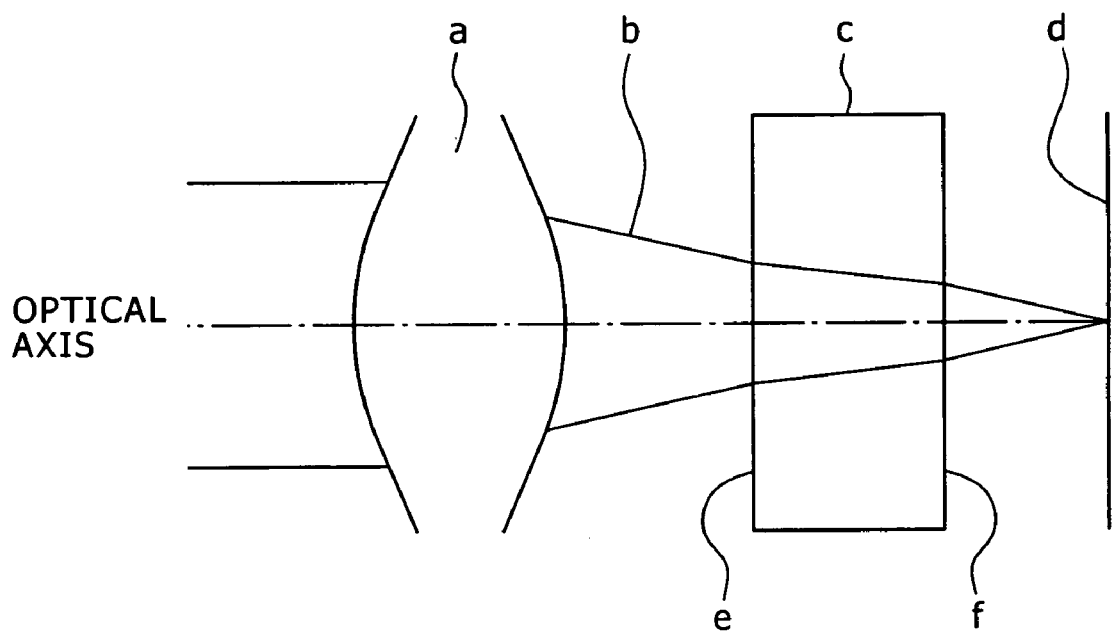
FIG. 24 is a view illustrating the concept of the zoom lens of the present invention.

The concept of the zoom lens of the present embodiment is shown in FIG. 24.

An on-axis light flux b emitted from a zoom lens a passes through a prism c to reach an image plane d. In this case, an incident plane e is fixed. An image shift amount δy when an exit plane f inclines by θ [rad] can be expressed by: $\delta y = L \cdot \theta (n-1)$. However, L denotes a distance from the exit plane f to the image plane d, and n denotes the refraction index of the prism c.

When the distance L from the prism c to the image plane d is made to be longer at the time of acquiring a predetermined image shift amount δy, the angle θ of the apex angle of the prism c can be made small.

In the zoom lens of the present embodiment, the conditional expression (2) is satisfied so as to extend the distance L from the prism c to the image plane d up to a point that does not results too much of the size.

In the following, the details of each of the conditional expressions (1), (2) and (3) will be described.

$$0.25 < \phi b / \phi < 0.8 \qquad \text{Conditional Expression (1)}$$

where

φb: refractive power of the rear side lens group at a wide angle end,

φ: refractive power of the whole zoom lens at the wide angle end.

The conditional expression (1) is a conditional expression that defines an exit pupil position.

Figure 25:
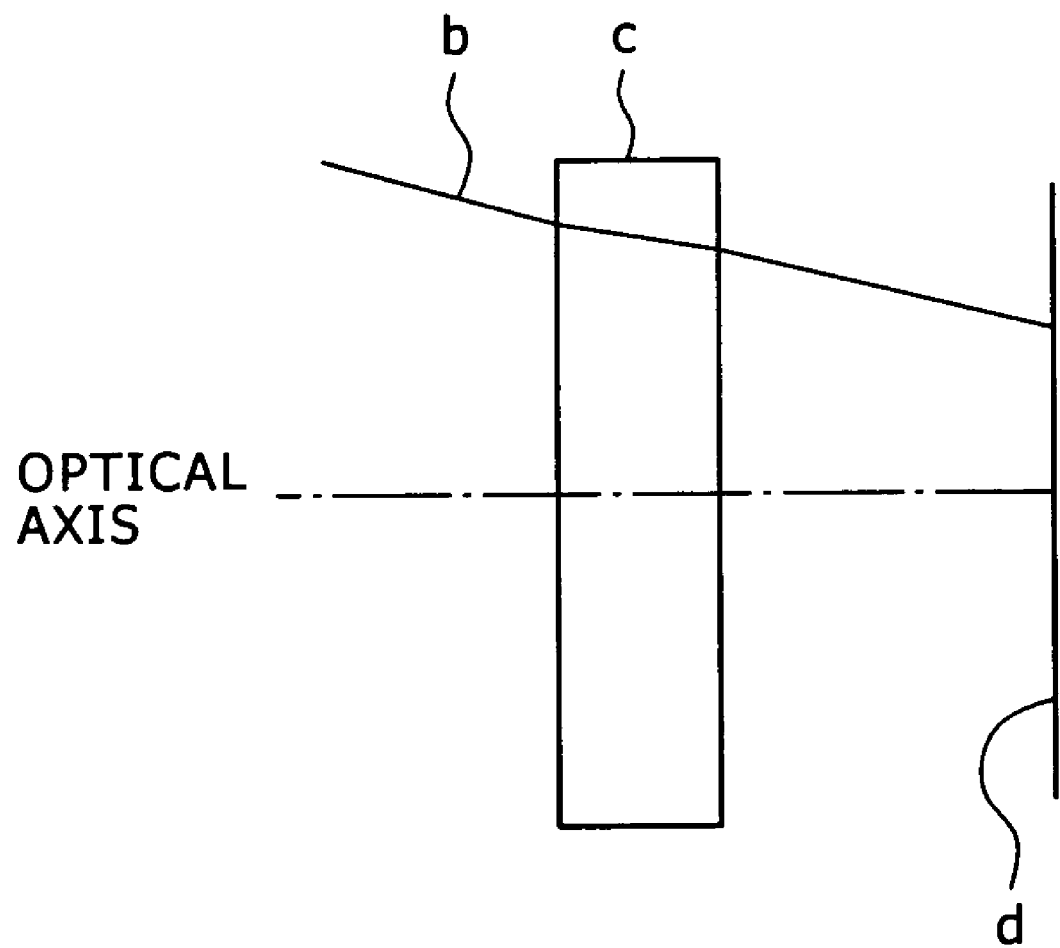
FIG. 25 is a view illustrating a conditional expression (1) together with FIG. 26, and the present view illustrates a state of exceeding an upper limit value.

Because the refractive power of the rear side lens group becomes strong when the ratio φb/φ exceeds the upper limit value of the conditional expression (1), as shown in FIG. 25, the on-axis light flux b entering the prism c enters in such a way that it approaches to the optical axis, and the incident angle thereof becomes larger. As a result, trapezoid distortion occurs in a peripheral portion of the image plane area, which is not preferable.

Figure 26:
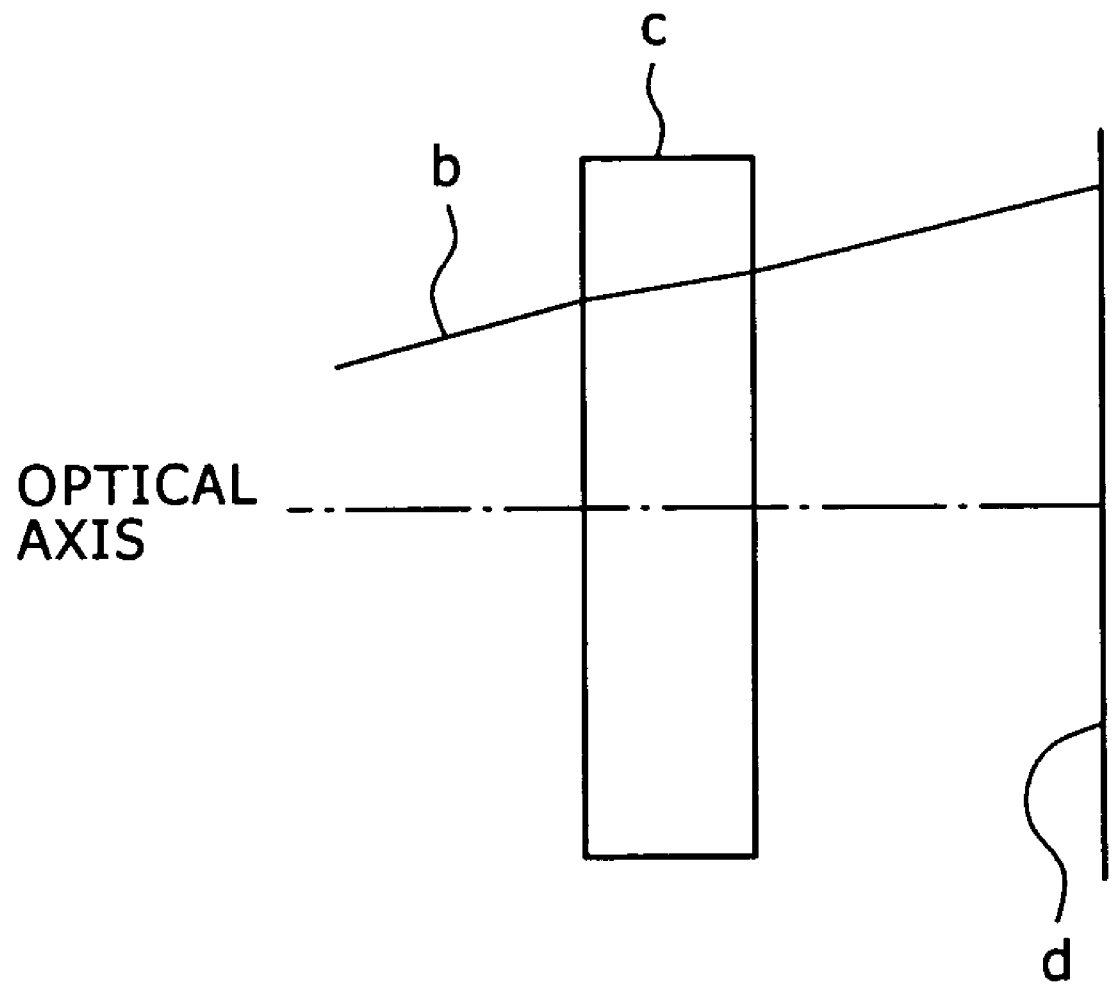
FIG. 26 is a view illustrating a state of being less than a lower limit value.

On the other hand, when the ratio φb/φ is less than the lower limit value of the conditional expression (1), the refractive power of the rear side lens group becomes weaker. Consequently, as shown in FIG. 26, the on-axis light flux b entering the prism c enters in such a way that it leaves the optical axis, and the incident angle thereof becomes larger. As a result, trapezoid distortion occurs in the peripheral portion of the image plane area, which is not preferable.

$$3 < BF \cdot FNO/Y\max \qquad \text{Conditional Expression (2)}$$

where

Bf: distance from the exit plane to the image plane of the prism in the telephoto end along the optical axis, FNO: F number in the telephoto end, Ymax: maximum image height.

The conditional expression (2) is a conditional expression which defines a back-focus.

When the value of BF·FNO/Ymax is less than the lower limit value of the conditional expression (2), the back-focus becomes short. Consequently, the apex angle of the prism c necessary for shifting an image by a predetermined amount becomes large. As a result, it becomes difficult to adequately suppress the changes of the coma aberration at the time of shifting the image.

In addition, it is more preferable to set the upper limit value of the conditional expression (2) to 12 in the zoom lens of the present embodiment. If the back-focus becomes too long, the whole size of the lens system becomes too large, which is not preferable.

In the zoom lens of the present embodiment, it is desirable to include at least one or more movable lens group in both of the front side lens group and the rear side lens group, and it is also desirable to satisfy the following conditional expression (3), in order to balance the reduction in the lens diameter and the enhancement of performance.

$$0.4 < Ds/TL < 0.7 \qquad (3)$$

where

Ds: distance from the aperture diaphragm to the image plane along the optical axis in the wide angle end, TL: distance from the lens surface at the position nearest to the object side of the zoom lens in the wide angle end to the image plane along the optical axis.

In the zoom lens, it is effective to actively change the height of the off-axis light flux which passes through each lens group when the change of an off-axis aberration accompanying a change of an angle of view is corrected. In particular, when the zoom lens includes movable lens groups both on the object side and the image side with the aperture diaphragm being positioned in between, it is possible to appropriately correct the change of the off-axis aberration occurring at the time when the lens position arrangement changes from the wide angle end, in which the focus distance is the shortest, to the telephoto end, in which the focus distance is the longest.

Moreover, if the movable lens group exists only on the object side of the aperture diaphragm, the aperture diaphragm position moves to the image side due to availability of space for the movable lens group. As a result, because the off-axis light flux which passes through the lens group disposed at a position distant from the aperture diaphragm leaves the optical axis, reduction of the lens diameter cannot be fully attained. Similarly, when the movable lens group exists only on the image side of the aperture diaphragm, reduction of the lens diameter cannot be fully attained.

Accordingly, in order to cope with both the reduction of the lens diameter and the further enhancement of the performance in the zoom lens of the present embodiment, it is desirable for both of the front side lens group and the rear side lens group to have at least one or more movable lens groups.

The conditional expression (3) is a conditional expression which defines the position of the aperture diaphragm in a lens system.

When the ratio Ds/TL is less than the lower limit value of the conditional expression (3), the off-axis light flux which passes through the lens group disposed at a position nearest to the object side leaves the optical axis, and it becomes very difficult to fully attain the reduction of the lens diameter in the wide angle end.

When the ratio Ds/TL exceeds the upper limit value of the conditional expression (3), the off-axis light flux passing through the rear side lens group leaves the optical axis so that the coma aberration occurs greatly in the peripheral portion of the image plane area to make it difficult to acquire a predetermined optical performance.

The (variable apex angle) prisms which can be used for the zoom lens of the present embodiment are shown in FIGS. 19 and 20, and FIGS. 21 and 22.

Figure 19:
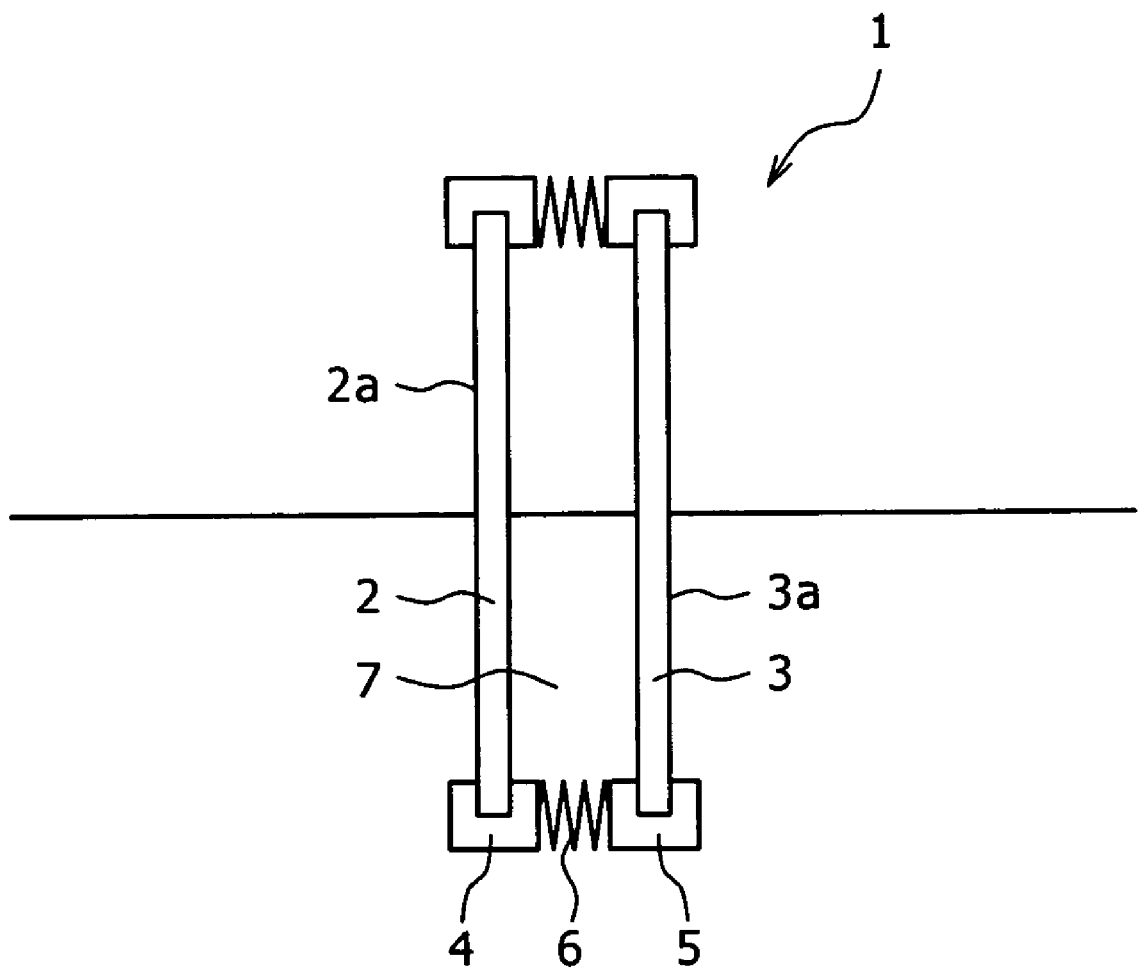
FIG. 19 shows a concrete example of a prism together with FIG. 20, and the present view is a schematic sectional view.
Figure 20:
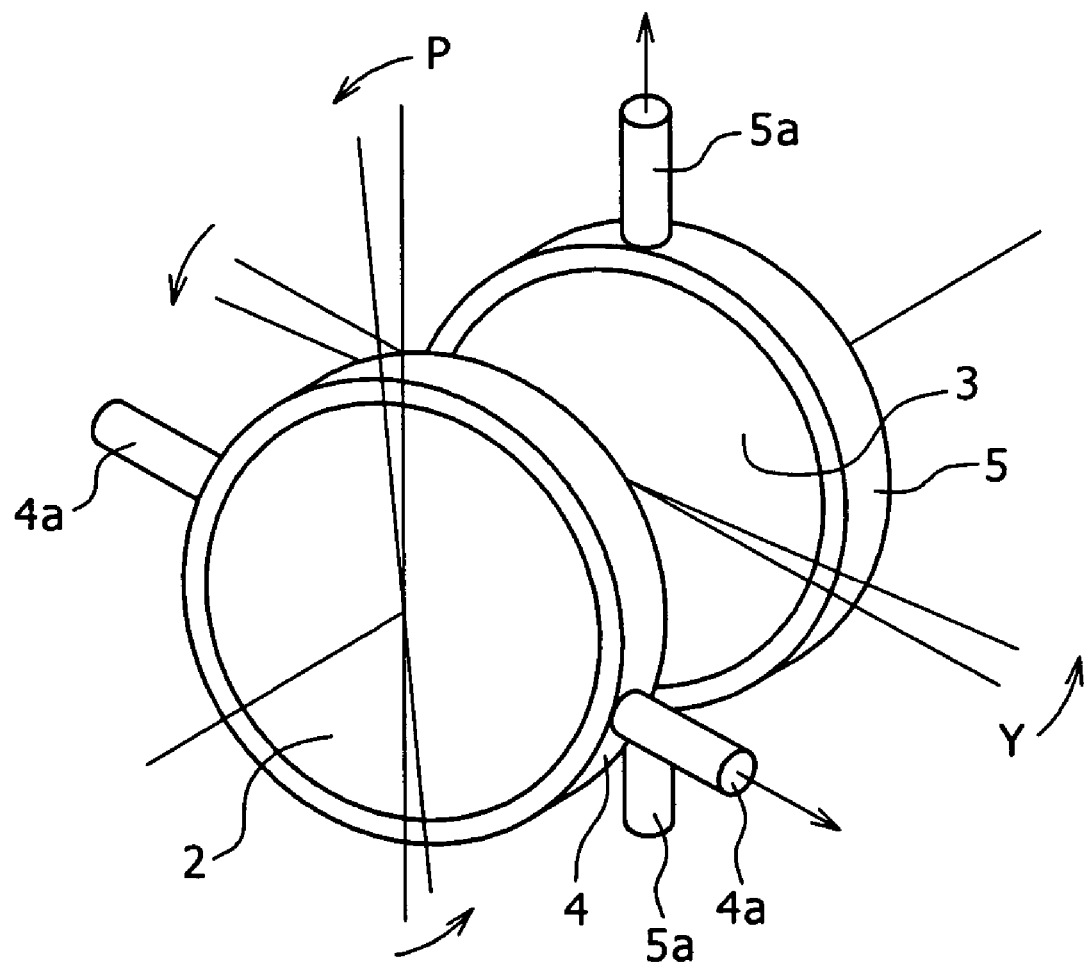
FIG. 20 is a partially omitted schematic perspective view.

The prism 1 shown in FIGS. 19 and 20 includes two transparent parallel flat plates 2 (a first parallel flat plate) and 3 (a second parallel flat plate), the circumferences of which are held with frames 4 and 5, respectively, a seal gum 6 shaped in bellows to seal the space between the circumferences of the frames 4 and 5, and a liquid 7 enclosed in a space sealed hermetically by the two parallel flat plates 2 and 3, the frames 4 and 5, and the seal gum 6. An object side surface 2a of the first parallel flat plate 2 is used as the incident plane, and the image side surface 3a of the second parallel flat plate 3 is used as the exit plane. Shafts 4a project from the frame 4 into a horizontal direction, and shafts 5a project from the frame 5 into a vertical direction.

For example, a glass plate can be used as each of the parallel flat plate 2 and 3. Moreover, a liquid having sufficient transmittance in a visible light region and having the uniformity of the transmittance, such as water, glycerol, silicone oil and the like, can be used as the liquid 7. Moreover, as long as a gel material satisfies the conditions mentioned above, the gel material such as silicone gel and the like can be also used. In addition, it is needless to say that the concrete materials are not limited to those mentioned here.

The frame 4 is rotatably supported around the shafts 4a, and the frame 5 is rotatably supported around the shafts 5a. When the frame 4 is inclined, the parallel flat plate 2 supported by the frame 4 is inclined in the direction of an arrow P. Thereby, the imaging region is shifted in the vertical direction. Moreover, when the frame 5 is inclined, the parallel flat plate 3 is inclined in the direction of an arrow Y. Thereby, the imaging region is shifted in the horizontal direction. Accordingly, by selecting the inclination directions and the angles of the frames 4 and 5, the imaging region can be shifted in all directions around the optical axis.

Figure 21:
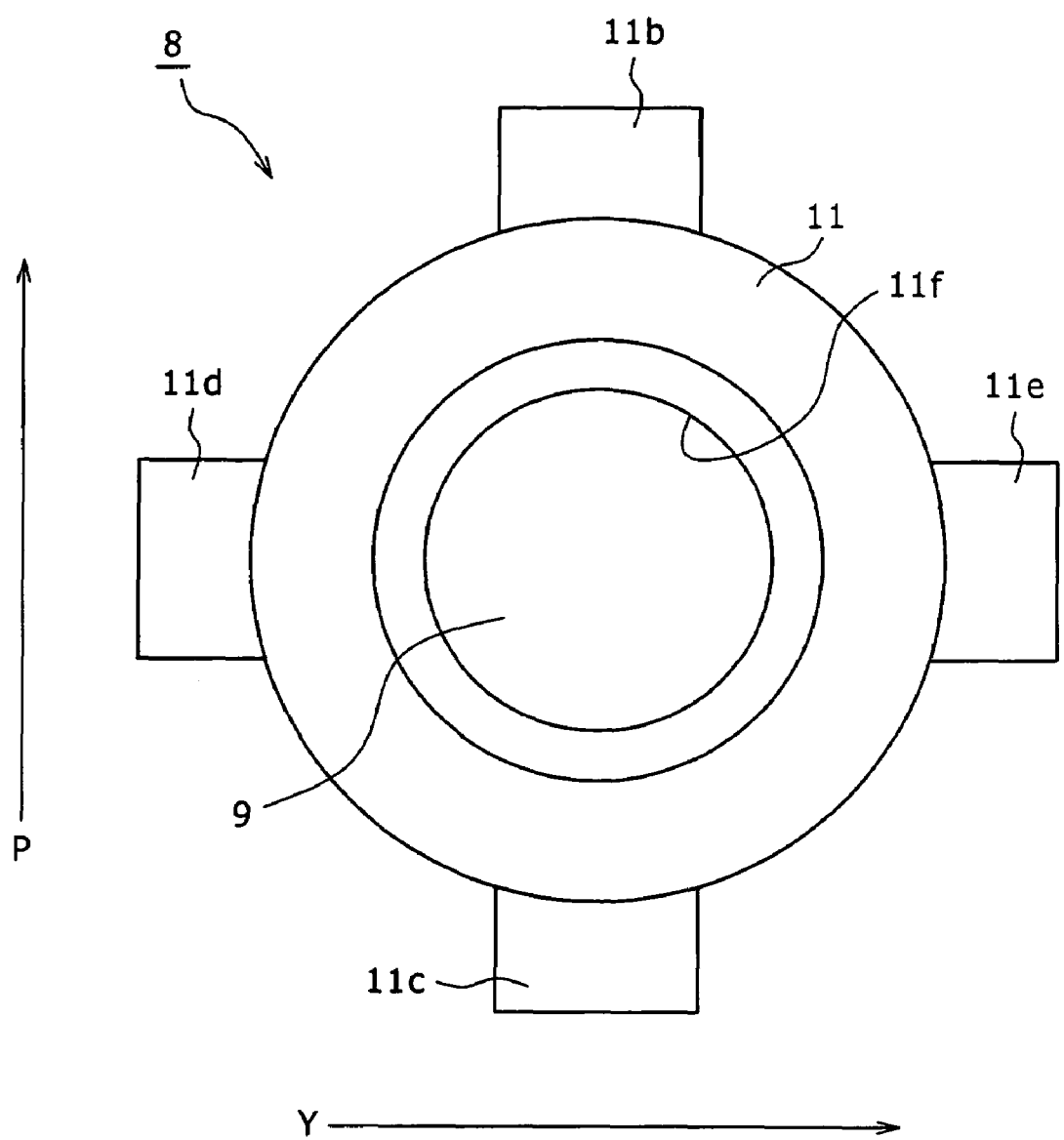
FIG. 21 shows another concrete example of the prism together with FIG. 22, and the present view is a schematic front view.
Figure 22:
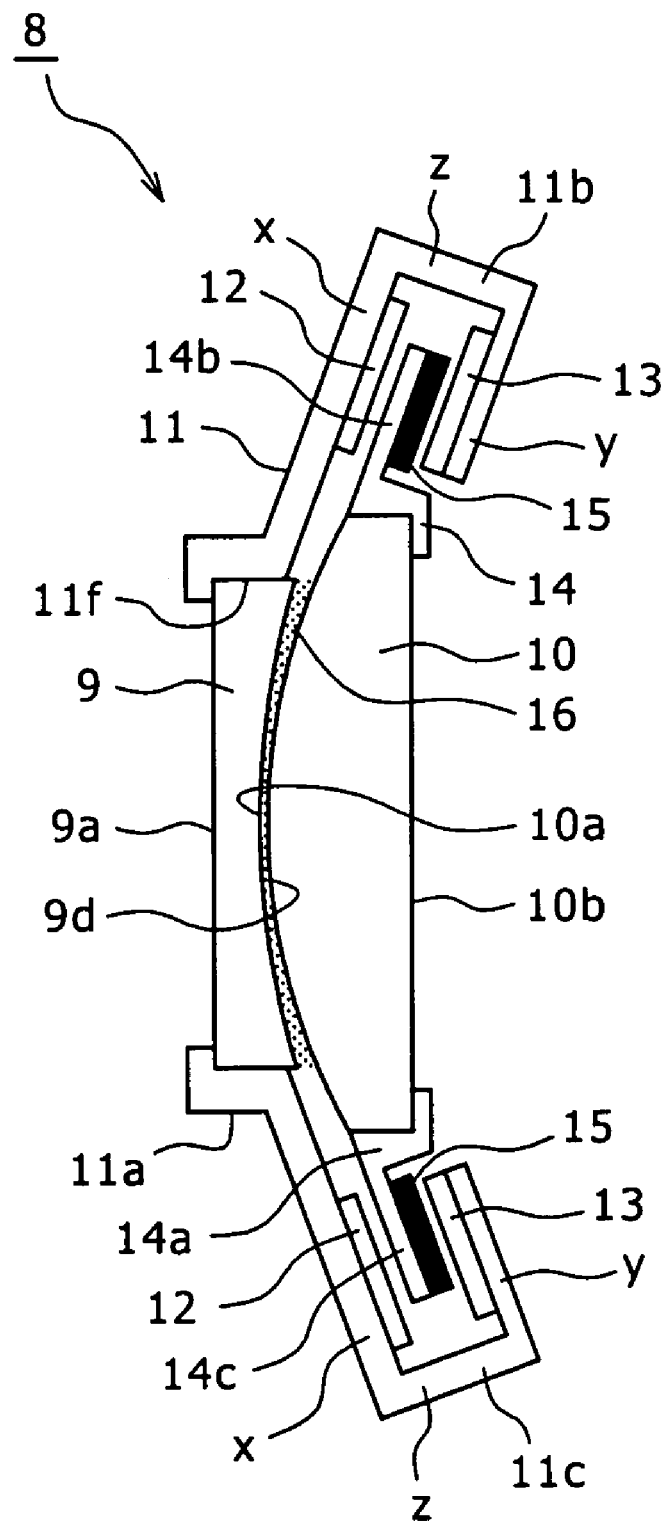
FIG. 22 is a longitudinal sectional view at the center of the front view of FIG. 21.

A prism 8 shown in FIGS. 21 and 22 includes a plane-concave lens 9 (a lens having an object side lens surface 9a being a plane and an image side lens surface 9b being a concave surface) as the first lens and a convex-plane lens 10 (a lens having an object side lens surface 10a being a convex surface and an image side lens surface 10b being a plane) as the second lens, the first and the second lenses combined with each other. The concave surface 9b of the plane-concave lens 9 and the convex surface 10a of the convex-plane lens 10 have severally almost the same radius of curvature. The prism 8 is configured to have a structure of adhering against the lenses 9 and 10 to each other closely on their curved surfaces with their plane being the outside. In the prism 8, the plane-concave lens 9 is fixed, and the angle between the planes 9a and 10b is changed by shifting the convex-plane lens 10 along the curved surfaces 9b and 10a.

The two lenses 9 and 10 are supported by a housing 11. The housing 11 includes a main portion 11a shaped in a circle when it is viewed from the front thereof, and four drive portions 11b, 11c, 11d and 11e projecting from the left, right, top and bottom of the main portion 11a to the outside, the main portion 11a and the drive portions 11b-11e formed in one body.

A circular attachment hole 11f having a diameter somewhat smaller than the external form of the main portion 11a is formed on the front side of the main portion 11a. The plane-concave lens 9 is held in the attachment hole 11f.

Each of the drive portions 11b-11e of the housing 11 includes a front surface potion x, a rear surface portion y and a connection portion z connecting the front surface portion x and the rear surface portion y at the outer end. A magnet 12 is fixed on the inner surface of the front surface portion x of each of the drive portions 11b-11e, and a yoke 13 is fixed on the inner surface of the rear surface portion y of each of the drive portions 11b-11e to be opposed to the magnet 12.

The convex-plane lens 10 is held by a lens holding frame 14.

The lens holding frame 14 includes a circular frame 14a, and four coil holding portions 14b, 14c, 14x and 14x (only top and bottom ones 14b and 14c are shown in FIG. 22) projecting from the left, right, top and bottom of the frame 14a to the outside. The convex-plane lens 10 is held by the frame 14a, and a coil 14 is supported on the rear surface of each of the coil holding portions 14b-14x.

In the lens holding frame 14, the four coil holding portions 14b-14x are inserted into the drive portions 11b-11e of the housing 11, and thereby the coil 15 is located between the magnet 12 and the yoke 13 in each of the drive portions 11b-11e. Then, the object side surface (convex surface) 10a of the convex-plane lens 10 are set to be in a state of being almost contacted with the image side surface (concave surface) 9b of the plane-concave lens 9, and an oil 16 intervenes between the two surfaces 9b and 10a as a medium to reduce the friction between them.

In the prism 8, the lens holding frame 14 moves to the upper, lower, right and left sides in a predetermined range according to the existence of the electrification to the coils 15 held in the coil holding portions 14b-14x of the lens holding frame 14 and the direction of the electrification. When the direction of the electrification is one causing the absorption by the magnetic field formed between the magnet 12 and the yoke 13 (hereinafter referred to as "absorption direction") in the case where the electrification is performed into the coil holding portion 14b on the upper side of the lens holding frame 14, for example, the lens holding frame 14 is moved upward so that the coil 14b is located in the magnetic field. When the direction of the electrification is one causing repulsion to the magnetic field formed between the magnet 12 and the yoke 13 (hereinafter referred to "repulsion direction"), the lens holding frame 14 is moved downward so that the coil 14b goes out of the magnetic field.

Consequently, when the electrification in the same direction is performed to all of the four coils 14b-1x held by the lens holding frame 14, the lens holding frame 14 is held in the neutral state shown in FIG. 22. Then, the convex-plane lens 10 held by the lens holding frame 14 is located so that the optical axis thereof agrees with the optical axis of the optical system.

For example, when the electrification in the absorption direction is performed to the coil 14b on the upper side and no electrification is performed to the other coils 14c, 14x and 14x or the electrification in the repulsion direction is performed to the other coils 14c-14x, the lens holding frame 14 (the convex-plane lens 10 as a result) is moved upward. When the electrification in the absorption direction is performed to the coil 14c on the lower side and no electrification is performed to the other coils 14b-14x or the electrification in the repulsive direction is performed to the other coils 14b-14x, the lens holding frame 14 (the convex-plane lens 10 as a result) is moved downward. Similarly, the electrification in the absorption direction is performed to only the left side coil 14x or the right side coil 14x and no electrification is performed to the other coils 14b, 14c and 14x or the electrification in the repulsion direction is performed to the other coils 14b, 14c and 14x, the lens holding frame 14 (the convex-plane lens 10 as a result) is moved toward the left side or the right side, respectively.

When the electrification in the absorption direction is performed to the coils 14b and 14x on the upper side and the left side, respectively, and no electrification is performed to the other coils 14c and 14x or the electrification in the repulsive direction is performed to the other coils 14c and 14x, the lens holding frame 14 (the convex-plane lens 10 as a result) is moved toward the upper left side. When the electrification in the absorption direction is performed to the coils 14c and 14x on the lower side and the right side and no electrification is performed to the other coils 14b and 14x or the electrification in the repulsive direction is performed to the other coils 14b and 14x, the lens holding frame 14 (the convex-plane lens 10 as a result) is moved toward the lower right side.

As described above, it is possible to adjust the movement amount in each direction by adjusting the current amount of the electrification to each of the four coils 14b, 14c, 14x and 14x. Accordingly, it is possible to move the lens holding frame 14 (the convex-plane lens 10 as a result) into an arbitrary direction among the directions of 360 degrees around the optical axis of the optical system by an arbitrary distance by adjusting the electrification direction and the current amount into each of the four coils 14b, 14c, 14x and 14x.

Then, because the object side surface 10a of the convex-plane lens 10 moves along the image side surface 9b of the plane-concave lens 9, the angle formed between the object side surface (incident plane) 9*a* of the plane-concave lens 9 and the image side surface (exit plane) 10*b* of the convex-plane lens 10, i.e. the apex angle, is changed. Consequently, the light flux having entered the incident plane 9*a* in parallel to the optical axis of the optical system is emitted from the exit plane 10*b* with an angle to the optical axis of the optical system except for the case where the incident plane 9*a* and the exit plane 10*b* are opposed to each other in parallel, namely when the prism 8 has an apex angle. Accordingly, by forming an inclination between the incident plane 9*a* and the exit plane 10*b*, the field of view can be shifted into the direction almost perpendicular to the optical axis of the optical system in the direction and by the amount according to the apex angle based on the inclination. In addition, it is also possible to use the plane 10*b* of the convex-plane lens 10 as the incident plane and to use the plane 9*a* of the plane-concave lens 9 as the exit plane. In addition, even if a prism is a variable apex angle prism other than the prisms shown in FIGS. 19-22, the prism can be used for the zoom lens of the present embodiment.

In the following, the embodiments of the zoom lens of the present invention and numerical value examples in which concrete numerical values are applied to each of the embodiments will be described with reference to FIGS. 1-18 and Tables 1-15.

In addition, the aspherical surface forms adopted in each numerical value example is expressed by the following formula 1.

$$x = cy^2/(1+(1-(1+\kappa)c^2y^2)^{1/2})+Ay^4+By^6+ \quad \text{Formula 1}$$

where y denotes a height from an optical axis, x denotes a sag amount, c denotes a curvature, κ denotes a conical constant, A, B, . . . denote aspherical surface coefficients.

FIG. 1 shows a refractive power arrangement of a zoom lens 20 according to a first embodiment. A first lens group G1 having positive refractive power, a second lens group G2 having negative refractive power, a third lens group G3 having positive refractive power, a fourth lens group G4 having positive refractive power, a fifth lens group G5 having positive refractive power and a prism P are arranged to be configured in order from an object side. When the magnification is changed from a wide angle end to a telephoto end, the second lens group G2 moves to an image side so that the air space between the first lens group G1 and the second lens group G2 increases and the air space between the second lens group G2 and the third lens group G3 decreases. At this time, the first lens group G1, the third lens group G3, the fifth lens group G5 and the prism P are fixed, and the fourth lens group G4 moves in order to correct the change of an image plane position caused by the movement of the second lens group G2 and moves to the object side at the time of short distance focusing.

Figure 2:
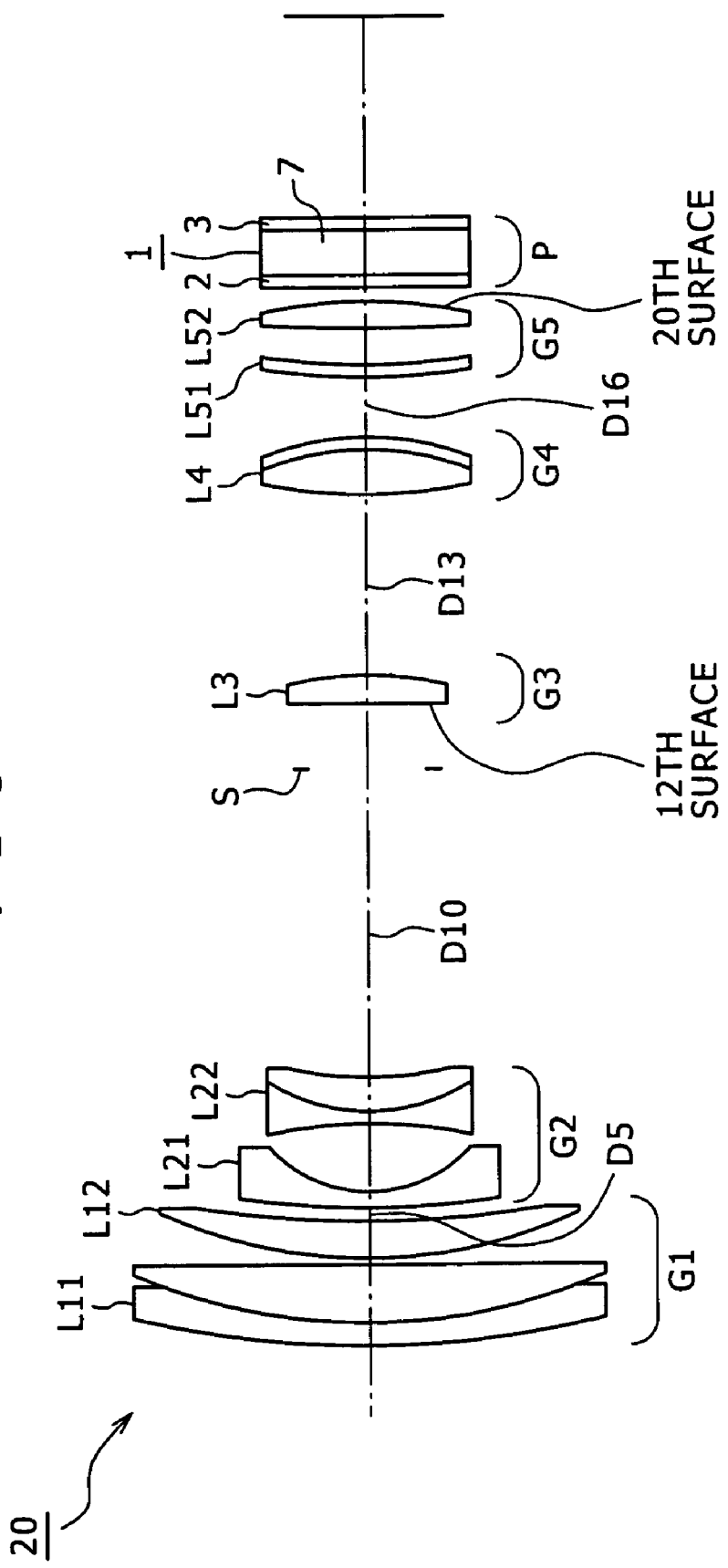
FIG. 2 is a view showing the lens configuration of the zoom lens according to the first embodiment.

FIG. 2 is a view showing the lens configuration of the zoom lens 20 according to the first embodiment, and each lens group is configured as follows.

The first lens group G1 includes a cemented lens L11 of a negative lens having a convex surface facing the object side and being shaped in the meniscus form, and a positive lens having a convex surface facing the object side; and a positive lens L12 having a convex surface facing the object side. The second lens group G2 includes a negative lens L21 having a concave surface facing the image side and being formed in the meniscus form; and a cemented lens L22 of a negative lens formed in a biconcave form and a positive lens having a convex surface facing the objective side and being formed in the meniscus form. The third lens group G3 includes a positive lens L3 formed in a biconvex form. The fourth lens group G4 includes a cemented positive lens L4 of a positive lens formed in a biconvex form and a negative lens having a concave surface facing the object side and being formed in the meniscus form. The fifth lens group G5 includes a negative lens L51 having a concave surface facing the image side and a biconvex lens L52. The prism P is designated by numeral 1 and has a structure shown in FIGS. 19 and 20.

In addition, an aperture diaphragm S is disposed at a position near to the object side of third lens group G3, and is fixed when changing the magnification.

The values of the specifications of the numerical value example 1 in which concrete numerical values are applied to the first embodiment is shown in Table 1. In addition, the surface number in the following specification tables indicates an $i^{th}$ surface from the object side, a radius of curvature indicates the on-axis radius of curvature of the surface, a refraction index indicates the value to the d line (λ=587.6 nm) of the surface, an Abbe number indicates the value to the d line of the surface, f indicate a focus distance, FNO indicates an F number, and 2ω indicates an angle of view. Moreover, a radius of curvature 0 indicates a plane.

TABLE 1

| f | 8.14~38.32 |
|---|---|
| FN0 | 2.88~3.24 |
| 2ω | 60.60~13.27° |

| SURFACE NUMBER | RADIUS OF CURVATURE | SURFACE INTERVAL | REFRACTION INDEX | ABBE NUMBER |
|---|---|---|---|---|
| 1: | 58.0469 | 1.200 | 1.92286 | 20.9 |
| 2: | 31.8566 | 3.472 | 1.77250 | 49.6 |
| 3: | 385.6446 | 0.200 | | |
| 4: | 26.5423 | 2.557 | 1.69680 | 55.3 |
| 5: | 72.1279 | (D5) | | |
| 6: | 72.1279 | 0.600 | 1.88300 | 40.8 |
| 7: | 7.7200 | 4.387 | | |
| 8: | −31.7152 | 0.500 | 1.49700 | 81.6 |
| 9: | 9.1943 | 2.299 | 1.90366 | 31.1 |

TABLE 1-continued

| | | | | |
|---|---|---|---|---|
| 10: | 30.4291 | (D10) | | (APERTURE DIAPHRAGM) |
| 11: | 0.0000 | 4.000 | | |
| 12: | 85.6791 | 1.335 | 1.76802 | 49.3 |
| 13: | −43.0892 | (D13) | | |
| 14: | 33.2563 | 2.706 | 1.49700 | 81.6 |
| 15: | −14.3230 | 0.500 | 1.94595 | 18.0 |
| 16: | −19.0368 | (D16) | | |
| 17: | 36.0011 | 0.500 | 1.94595 | 18.0 |
| 18: | 25.0000 | 2.546 | | |
| 19: | 100.0000 | 1.249 | 1.62041 | 60.3 |
| 20: | −30.7532 | 1.000 | | |
| 21: | 0.0000 | 0.500 | 1.51680 | 64.2 |
| 22: | 0.0000 | 3.000 | 1.51341 | 61.2 |
| 23: | 0.0000 | 0.500 | 1.51680 | 64.2 |
| 24: | 0.0000 | (Bf) | | |

A $12^{th}$ surface and a $20^{th}$ surface are formed as aspherical surfaces. Then, the $4^{th}$, the $6^{th}$, the $8^{th}$ and the $10^{th}$ aspherical surface coefficients A, B, C and D of these surfaces in the numerical value example 1 are shown in Table 2 together with the conical constants κ. In addition, in the Table 2 and the following tables showing aspherical surface coefficients, "E-i" indicates an exponential expression using 10 as a base, i.e. "$10^{-i}$", and for example "0.26029E-05" expresses "$0.26029 \times 10^{-5}$."

TABLE 2

| 12TH SURFACE | κ = −2.195038 A = −0.328381E−04 B = +0.772945E−06<br>C = −0.452069E−07 D = +0.749312E−09 |
|---|---|
| 20TH SURFACE | κ = 0.000000 A = +0.512475E−04 B = −0.870496E−06<br>C = +0.335183E−07 D = −0.418081E−09 |

When a lens position arrangement changes from the wide angle end to the telephoto end, a surface interval D5 between the first lens group G1 and the second lens group G2, a surface interval D10 between the second lens group G2 and the aperture diaphragm S, a surface interval D13 between the third lens group G3 and the fourth lens group G4, and a surface interval D16 between the fourth lens group G4 and the fifth lens group G5 change. Accordingly, each of the surface intervals mentioned above and back-foci BF in the wide angle end sate (f=8.143) and the telephoto end (f=38.317) in the numerical value example 1 are shown in Table 3.

TABLE 3

(VARIABLE INTERVAL TABLE)

| f | 8.143 | 38.317 |
|---|---|---|
| D5 | 0.900 | 17.980 |
| D10 | 18.881 | 1.801 |
| D13 | 11.469 | 6.016 |
| D16 | 3.865 | 9.288 |
| Bf | 12.127 | 12.127 |

A corresponding value of each of the conditional expressions (1)-(3) in the numerical value example 1 is shown in Table 4.

TABLE 4

| | |
|---|---|
| φb = 0.051 | |
| Ymax = 4.55 | |
| (1) | φb/φ = 0.415 |
| (2) | Bf · FN0/Ymax = 8.635 |
| (3) | Ds/TL = 0.564 |

Figure 5:
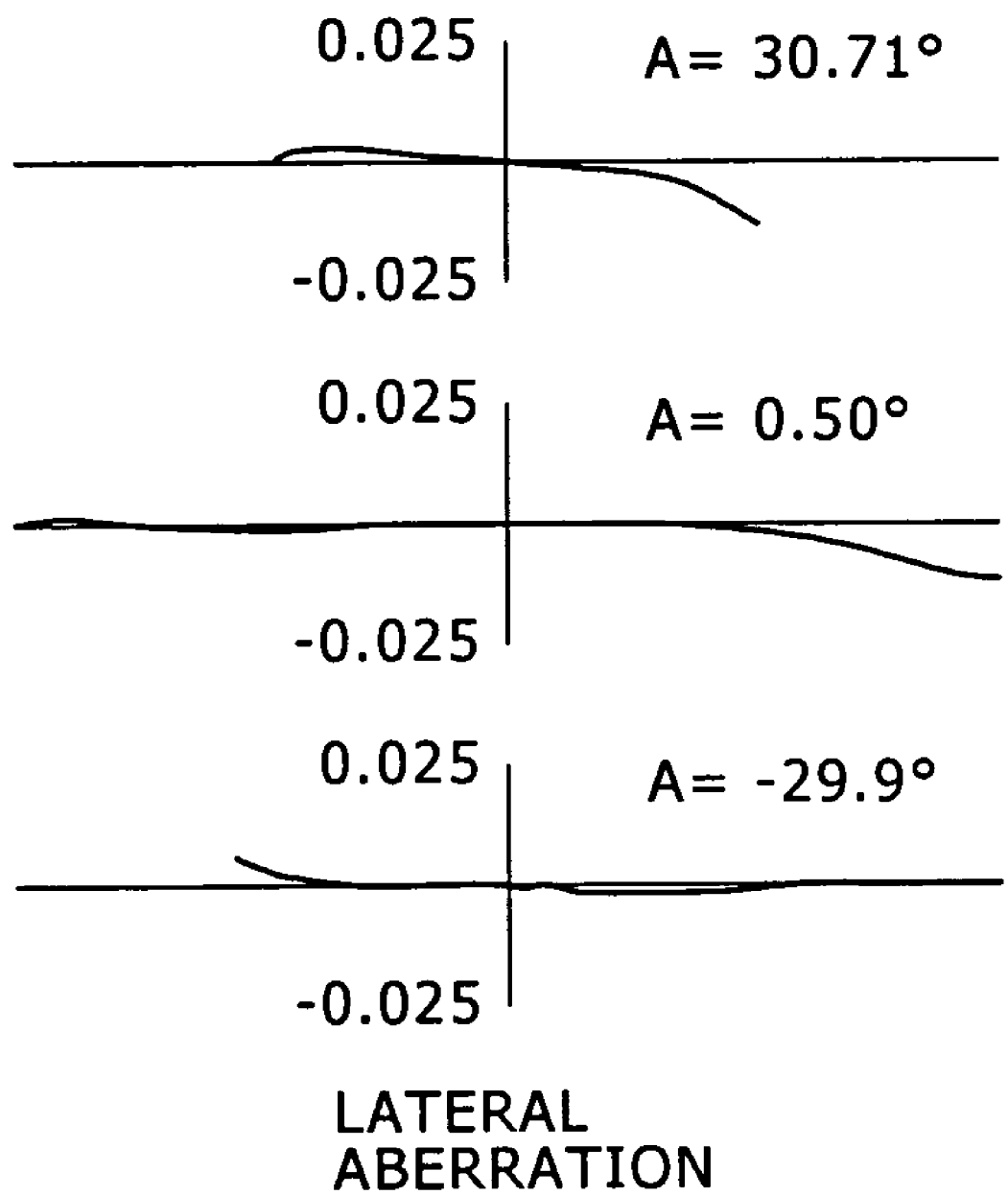
FIG. 5 shows lateral aberration in a state in which image movement equivalent to 0.5 degrees in the wide angle end has been corrected.

The apex angles of the prism 1 necessary for correcting the image movement of 0.5 degrees in the wide angle end and the telephoto end of the numerical value example 1 are shown in FIG. 5.

TABLE 5

| INCLINATION ANGLE AT CORRECTION OF 0.5 DEGREES | |
|---|---|
| WIDE | 0.652 DEGREES |
| TELE | 3.06 DEGREES |

Figure 3:
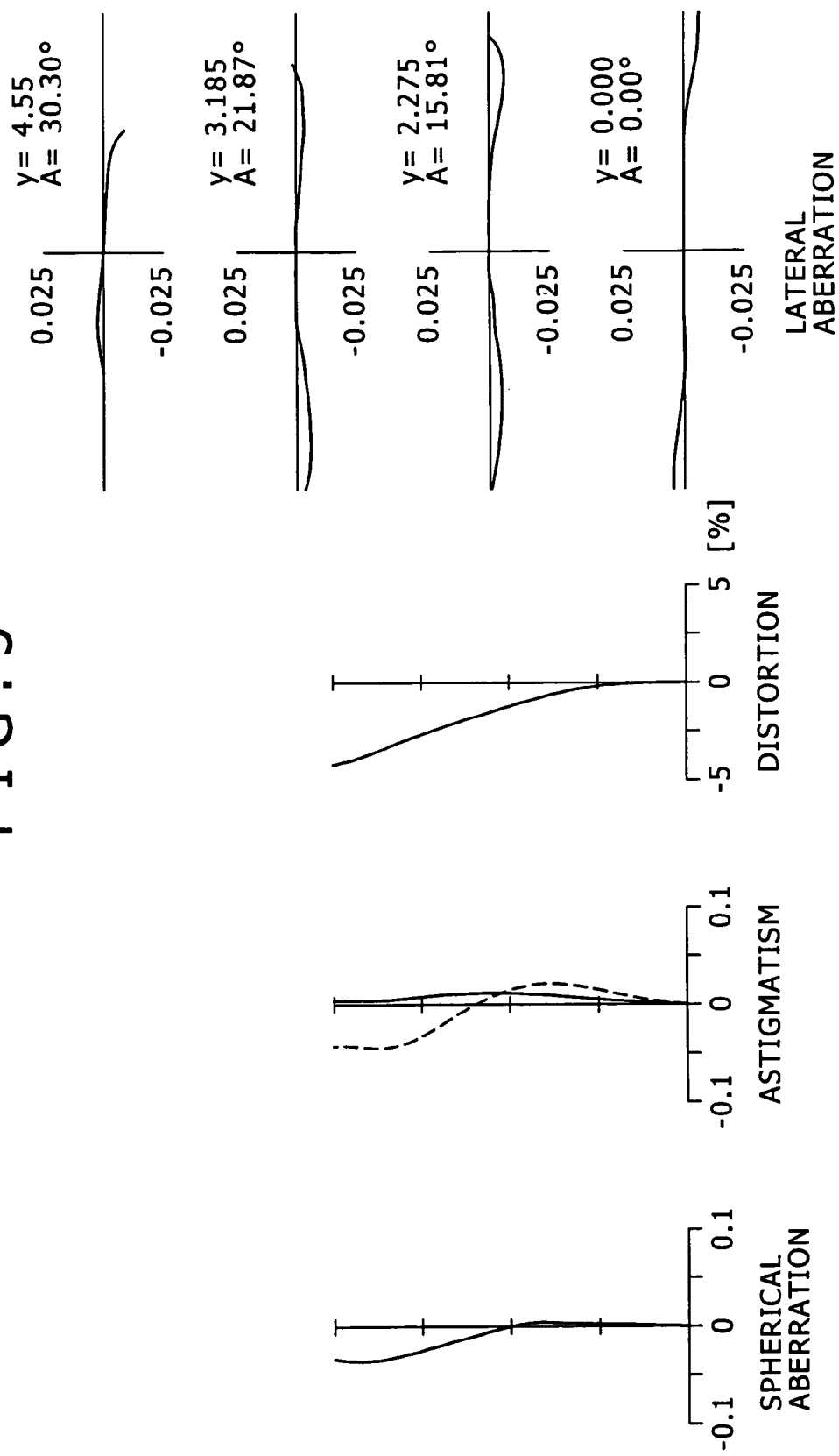
FIG. 3 shows various aberration diagrams of a numerical value example 1 in which concrete numerical values are applied to the first embodiment together with FIGS. 4-6, and the present diagram shows spherical aberration, astigmatism, distortion and lateral aberration in a wide angle end.
Figure 4:
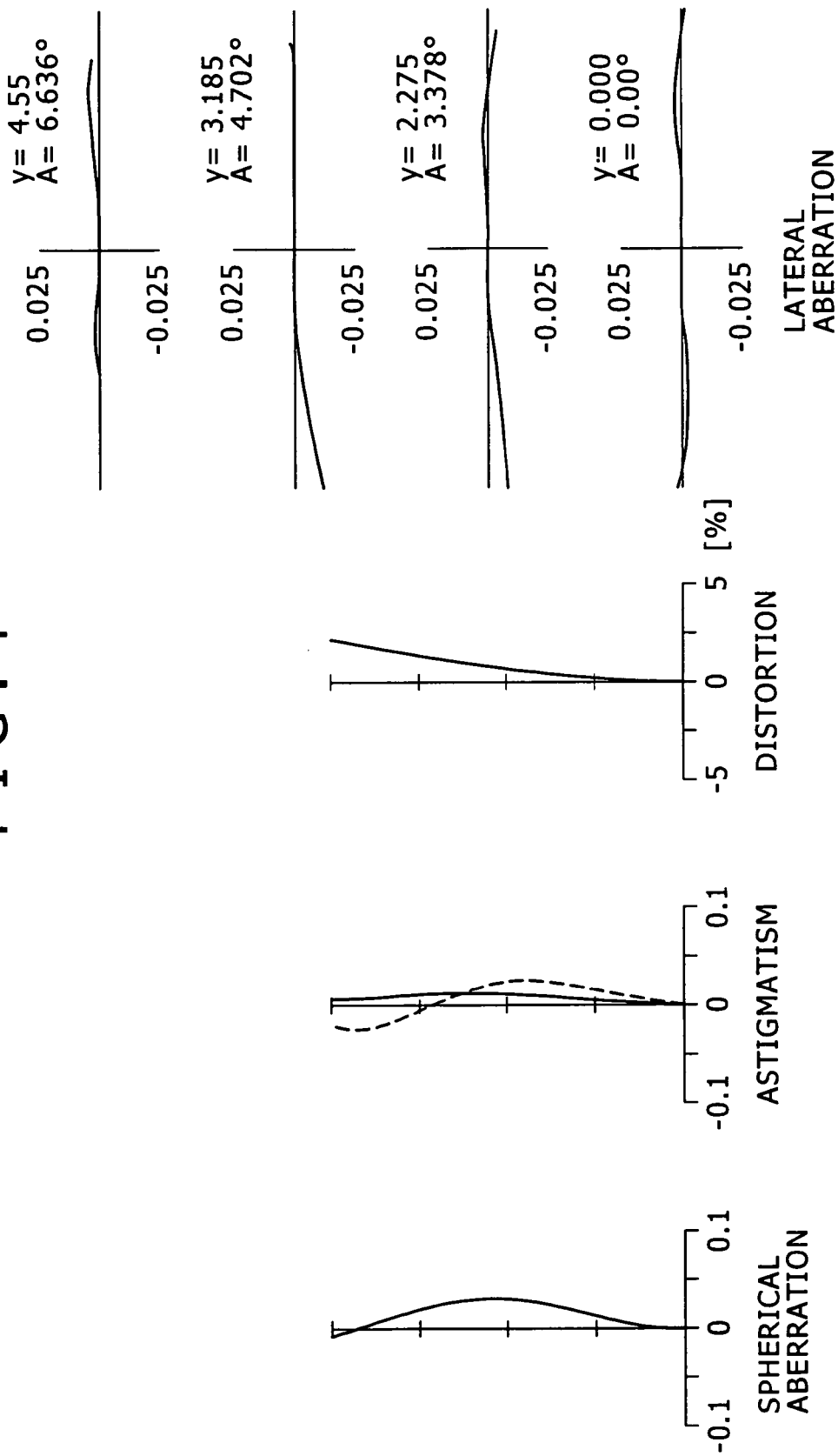
FIG. 4 shows spherical aberration, astigmatism, distortion and lateral aberration in a telephoto end.

FIGS. 3 and 4 severally show various aberration diagrams of the numerical value example 1 in the state of infinity focusing. FIG. 3 shows the various aberration diagrams at the wide angle end (f=8.143), and FIG. 4 shows the various aberration diagrams at the telephoto end (f=38.317).

In each aberration diagram in FIGS. 3 and 4, a solid line in the spherical aberration diagram expresses a spherical aberration, a solid line in the astigmatism diagram expresses a sagittal image plane, and a broken line in the astigmatism diagram expresses a meridional image plane. In each of the lateral aberration diagrams, A indicates a half-angle of view, and y indicates an image height.

Figure 6:
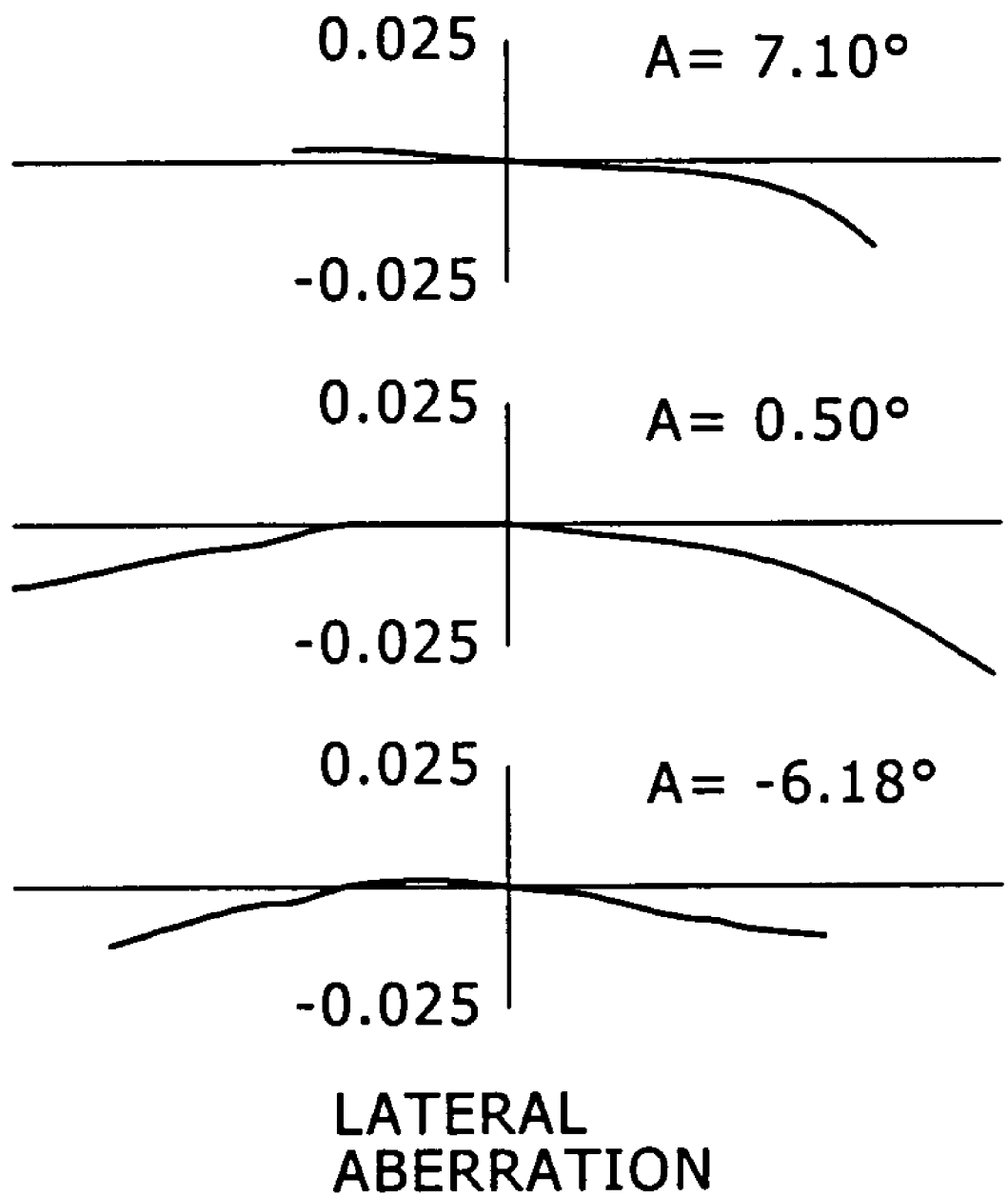
FIG. 6 shows lateral aberration in a state in which image movement equivalent to 0.5 degrees in the telephoto end has been corrected.

FIGS. 5 and 6 severally shows lateral aberration diagrams when a plane glass 3 is inclined by an amount necessary for correcting the image movement of 0.5 degrees in the infinity focusing in the numerical value example 1. FIG. 5 shows the lateral aberration diagrams in the wide angle end (f=8.143), and FIG. 6 shows the lateral aberration diagrams in the telephoto end (f=38.317).

It is clear from each aberration diagram that in the numerical value example 1 various aberrations are well corrected, and that the numerical value example 1 has an excellent image formation performance.

Figure 7:
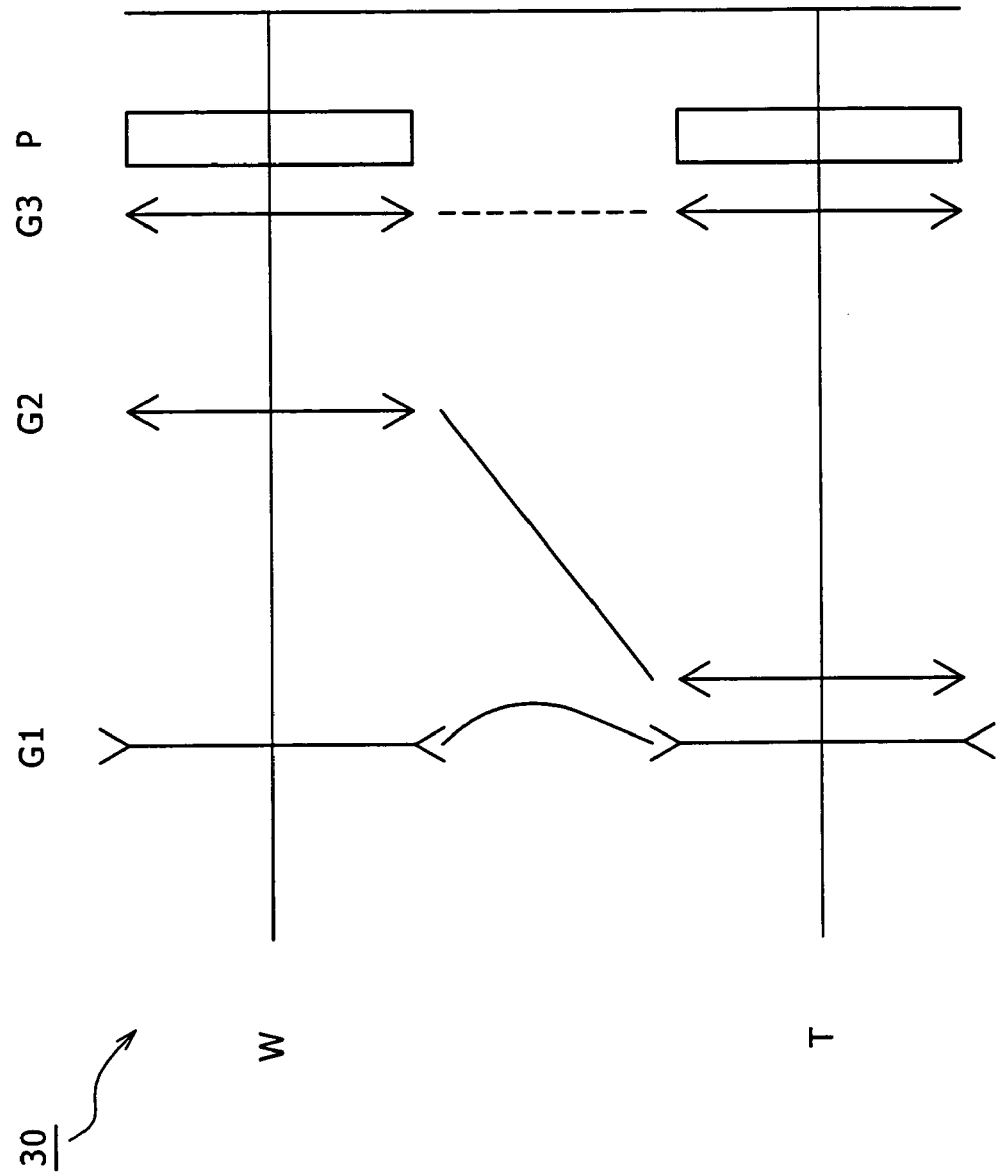
FIG. 7 is a diagram showing a refractive power arrangement of a second embodiment of the zoom lens of the present invention, the possibility of movement of each lens group at the time of zooming, and a locus of movement.

FIG. 7 shows a refractive power arrangement of a zoom lens 30 according to a second embodiment. Three lens groups of a first lens group G1 having negative refractive power, a second lens group G2 having positive refractive power and a third lens group G3 having positive refractive power are arranged to be configured in order from an object side. When the magnification is changed from a wide angle end to a telephoto end, the first lens group G1 moves to the object side after having moved to an image side once so that the air space between the first lens group G1 and the second lens group G2 decreases and the air space between the second lens group G2 and the third lens group G3 increases. At this time, the third lens group G3 and the prism P are fixed in the optical axis direction, and the third lens group G3 moves to the object side at the time of a short distance focusing.

Figure 8:
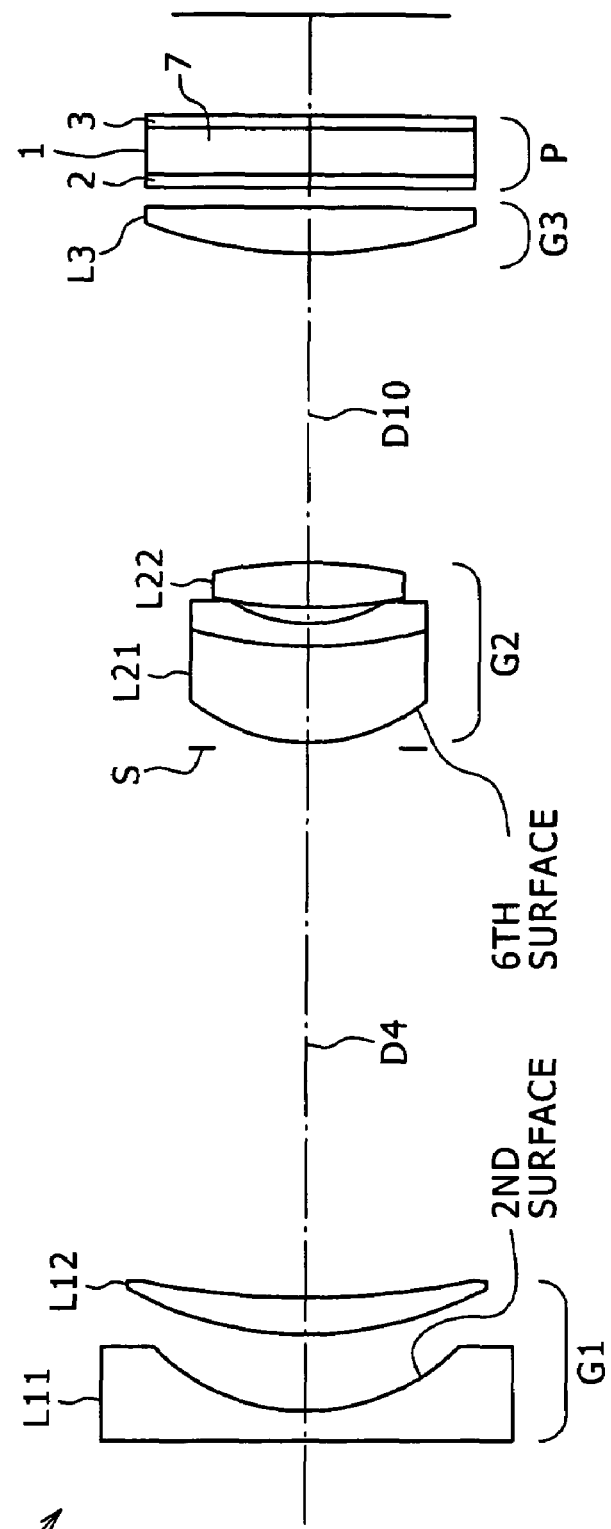
FIG. 8 is a view showing the lens configuration of the zoom lens according to the second embodiment.

FIG. 8 is a view showing the lens configuration of the zoom lens 30 according to the second embodiment, and each lens group is configured as follows.

The first lens group G1 includes a negative lens L11 having a convex surface facing the object side and being shaped in the meniscus form, and a positive lens L12 having a convex surface facing the object side and being shaped in the meniscus form. The second lens group G2 includes a cemented lens L21 of a positive lens having a convex surface facing the object side and being formed in the meniscus form and a negative lens having a concave surface facing the image side and being formed in the meniscus form; and a positive lens L22 formed in a biconvex form, both the lenses L21 and L22 arranged in order from the object side. The third lens group G3 includes a positive lens L3 having a convex surface facing the object side and being formed in the meniscus form. The prism P is designated by numeral 1 and has a structure shown in FIGS. 19 and 20.

In addition, an aperture diaphragm S is disposed at a position near to the object side of the second lens group G2, and moves together with the second lens group G2 when changing the magnification.

Table 6 shows the values of the specifications of the numerical value example 2 in which concrete numerical values are applied to the second embodiment.

TABLE 6

| f | 8.03~26.48 |
| FNO | 2.88~5.72 |
| 2ω | 61.26~19.49° |

| SURFACE NUMBER | RADIUS OF CURVATURE | SURFACE INTERVAL | REFRACTION INDEX | ABBE NUMBER | |
| --- | --- | --- | --- | --- | --- |
| 1: | 192.3597 | 1.000 | 1.79668 | 45.4 | |
| 2: | 6.6890 | 2.874 | | | |
| 3: | 13.3351 | 1.394 | 1.84666 | 23.8 | |
| 4: | 35.9996 | (D4) | | | (APERTURE |
| 5: | 0.0000 | 0.100 | | | DIAPHRAGM) |
| 6: | 6.4472 | 3.434 | 1.80610 | 40.7 | |
| 7: | 13.6986 | 0.800 | 1.92286 | 20.9 | |
| 8: | 5.6517 | 0.604 | | | |
| 9: | 16.0772 | 1.558 | 1.65160 | 58.4 | |
| 10: | −20.7709 | (D10) | | | |
| 11: | 16.6457 | 1.704 | 1.49700 | 81.6 | |
| 12: | 666.6667 | 0.700 | | | |
| 13: | 0.0000 | 0.500 | 1.51680 | 64.2 | |
| 14: | 0.0000 | 1.500 | 1.51341 | 61.2 | |
| 15: | 0.0000 | 0.500 | 1.51680 | 64.2 | |
| 16: | 0.0000 | (Bf) | | | |

A $2^{nd}$ surface and a $6^{th}$ surface are formed as aspherical surfaces. Then, the $4^{th}$, the $6^{th}$, the $8^{th}$ and the $10^{th}$ aspherical surface coefficients A, B, C and D of these surfaces in the numerical value example 2 are shown in Table 7 together with the conical constants κ.

TABLE 7

| | |
|---|---|
| 2ND SURFACE | κ = −1.867517 A = +0.443526E−03 B = −0.213251E−05 C = −0.000000E−00 D = +0.000000E−00 |
| 6TH SURFACE | κ = −0.682338 A = +0.130127E−03 B = +0.385416E−05 C = −0.653694E−07 D = +0.239730E−08 |

When the lens position arrangement changes from the wide angle end to the telephoto end, a surface interval D4 between the first lens group G1 and the aperture diaphragm S, and a surface interval D10 between the second lens group G2 and the third lens group G3 change. Accordingly, each of the surface intervals mentioned above and back-foci BF in the wide angle end sate (f=8.034) and the telephoto end (f=26.480) in the numerical value example 2 are shown in Table 8.

TABLE 8

| (VARIABLE INTERVAL TABLE) | | |
|---|---|---|
| f | 8.034 | 26.480 |
| D4 | 19.712 | 2.532 |
| D10 | 10.954 | 33.084 |
| Bf | 3.506 | 3.506 |

A corresponding value of each of the conditional expressions (1)-(3) in the numerical value example 2 is shown in Table 9.

TABLE 9

| | |
|---|---|
| φb = 0.063 | |
| Ymax = 4.55 | |
| (1) | φb/φ = 0.509 |
| (2) | Bf · FN0/Ymax = 4.408 |
| (3) | Ds/TL = 0.509 |

The apex angles of the prism 1 necessary for correcting the image movement of 0.5 degrees in the wide angle end and the telephoto end of the numerical value example 2 are shown in Table 10.

TABLE 10

| INCLINATION ANGLE AT CORRECTION OF 0.5 DEGREES | |
|---|---|
| WIDE | 2.22 DEGREES |
| TELE | 7.24 DEGREES |

Figure 9:
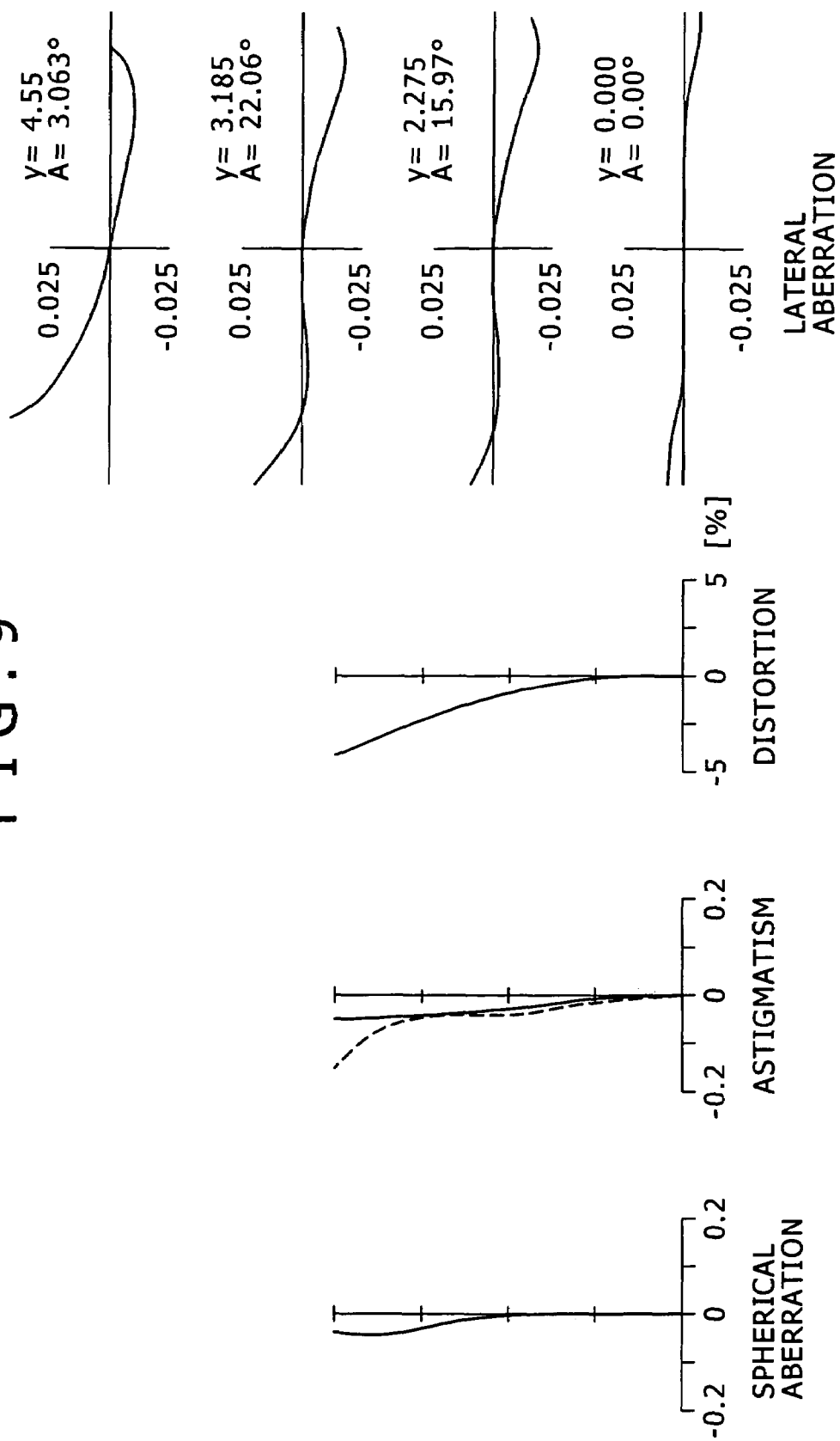
FIG. 9 shows various aberration diagrams of a numerical value example 2 in which concrete numerical values are applied to the second embodiment together with FIGS. 10-12, and the present diagram shows spherical aberration, astigmatism, distortion and lateral aberration in a wide angle end.
Figure 14:
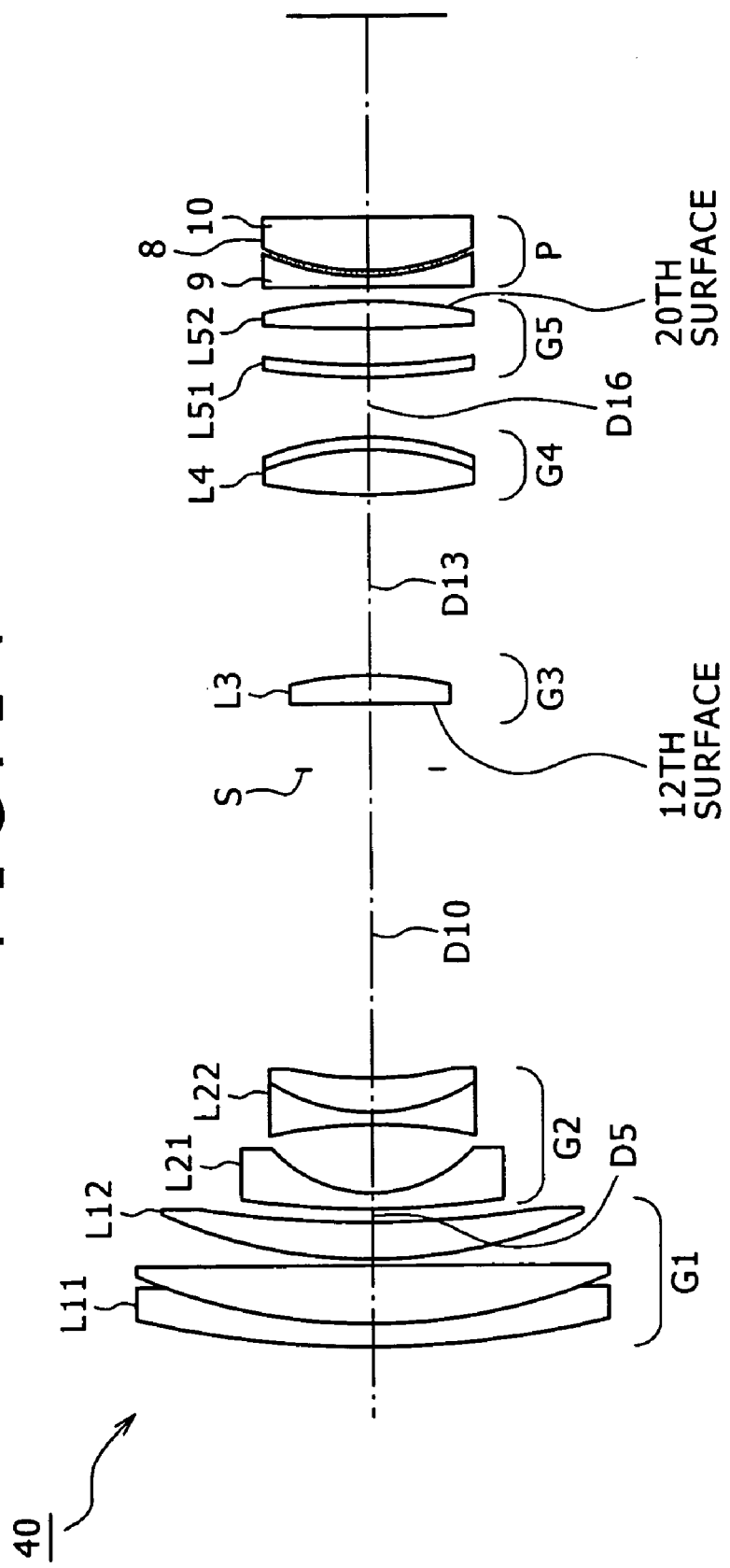
FIG. 14 is a view showing the lens configuration of the zoom lens according to the third embodiment.

FIGS. 9 and 14 severally show various aberration diagrams of the numerical value example 2 in the state of infinity focusing. FIG. 9 shows the various aberration diagrams at the wide angle end (f=8.034), and FIG. 10 shows the various aberration diagrams at the telephoto end (f=26.480).

Figure 10:
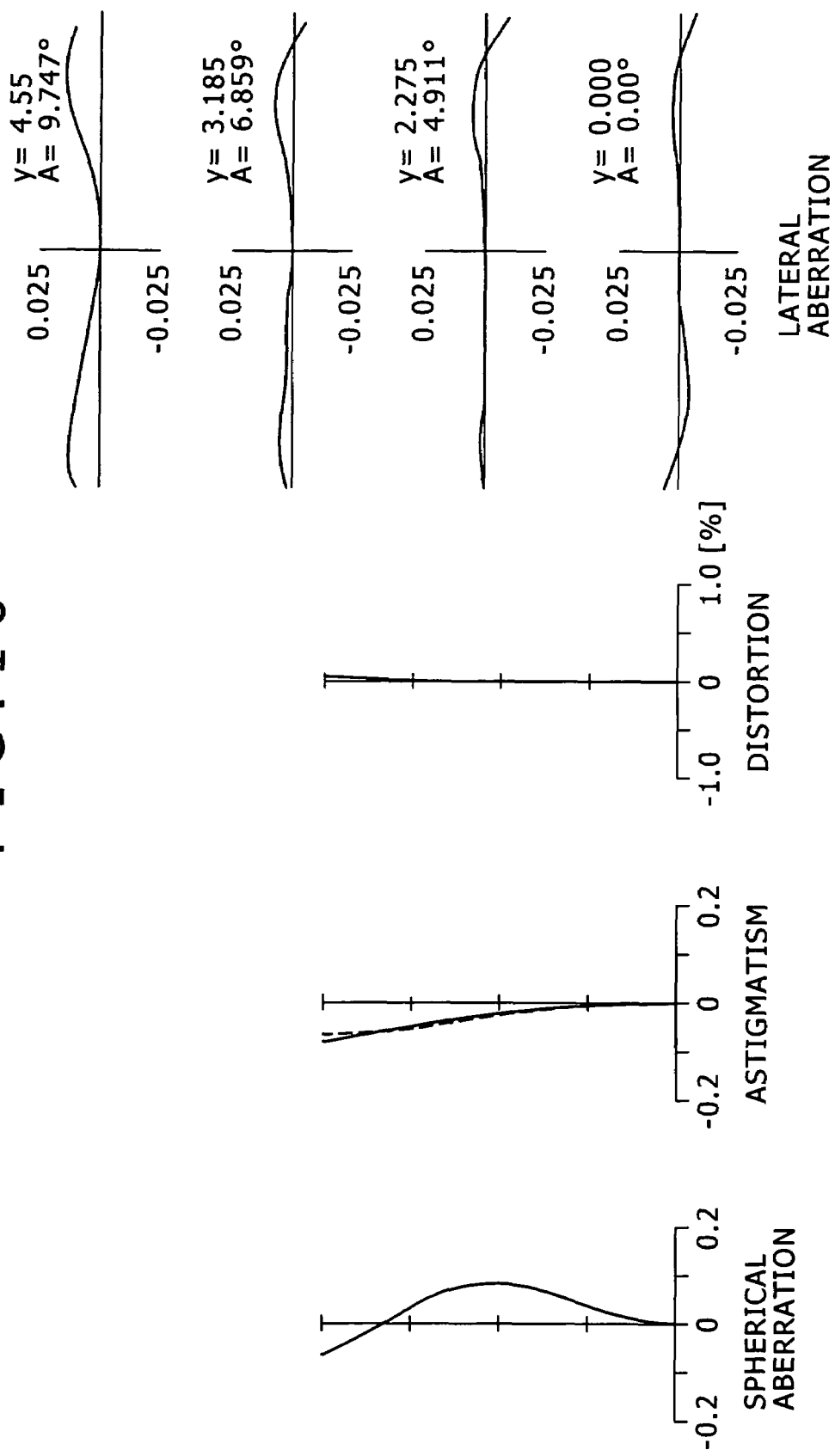
FIG. 10 shows spherical aberration, astigmatism, distortion and lateral aberration in a telephoto end.

In each aberration diagram in FIGS. 9 and 10, a solid line in the spherical aberration diagram expresses a spherical aberration, a solid line in the astigmatism diagram expresses a sagittal image plane, and a broken line in the astigmatism diagram expresses a meridional image plane. In each of the lateral aberration diagrams, A indicates a half-angle of view, and y indicates an image height.

Figure 11:
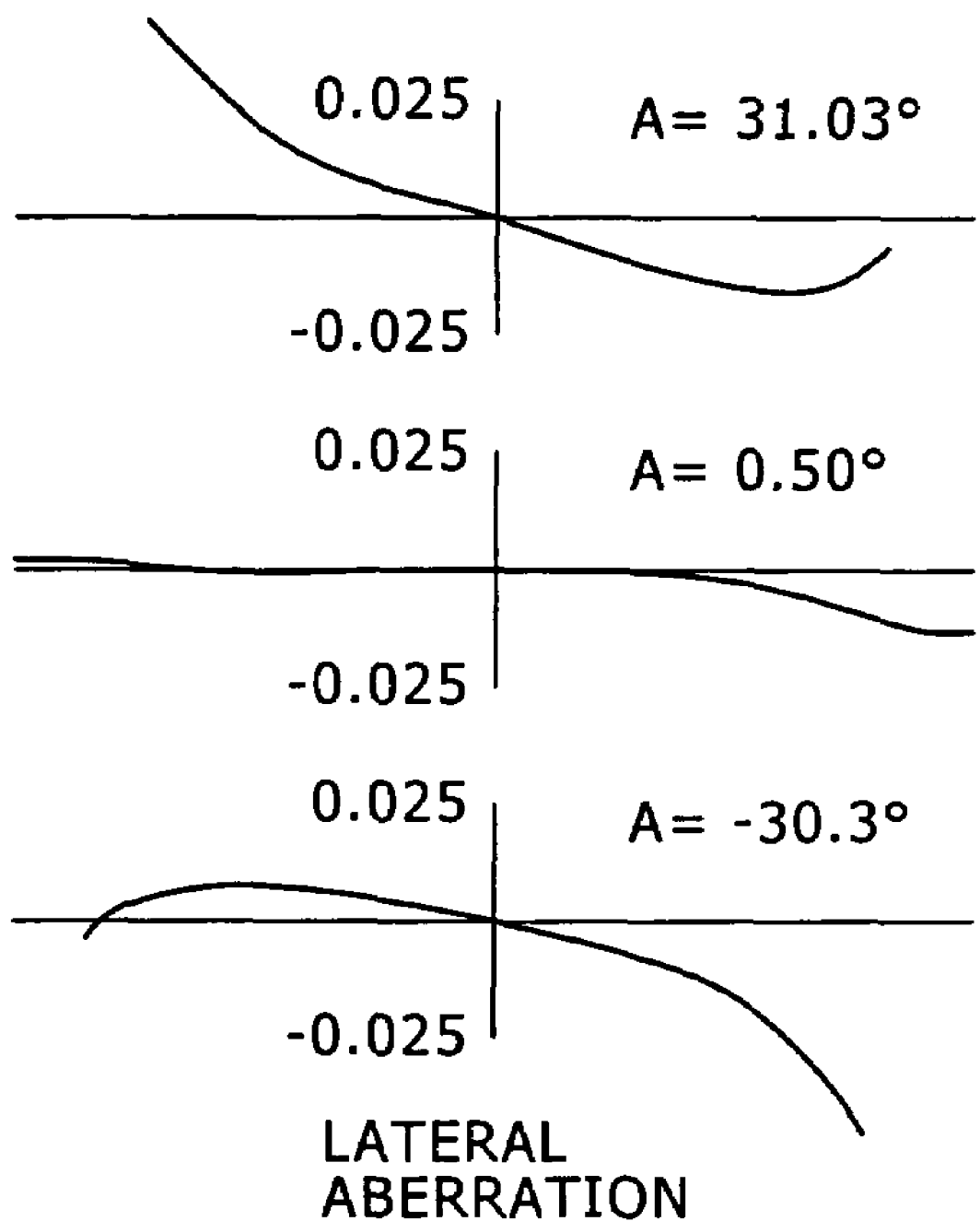
FIG. 11 shows lateral aberration in a state in which image movement equivalent to 0.5 degrees in the wide angle end has been corrected.
Figure 12:
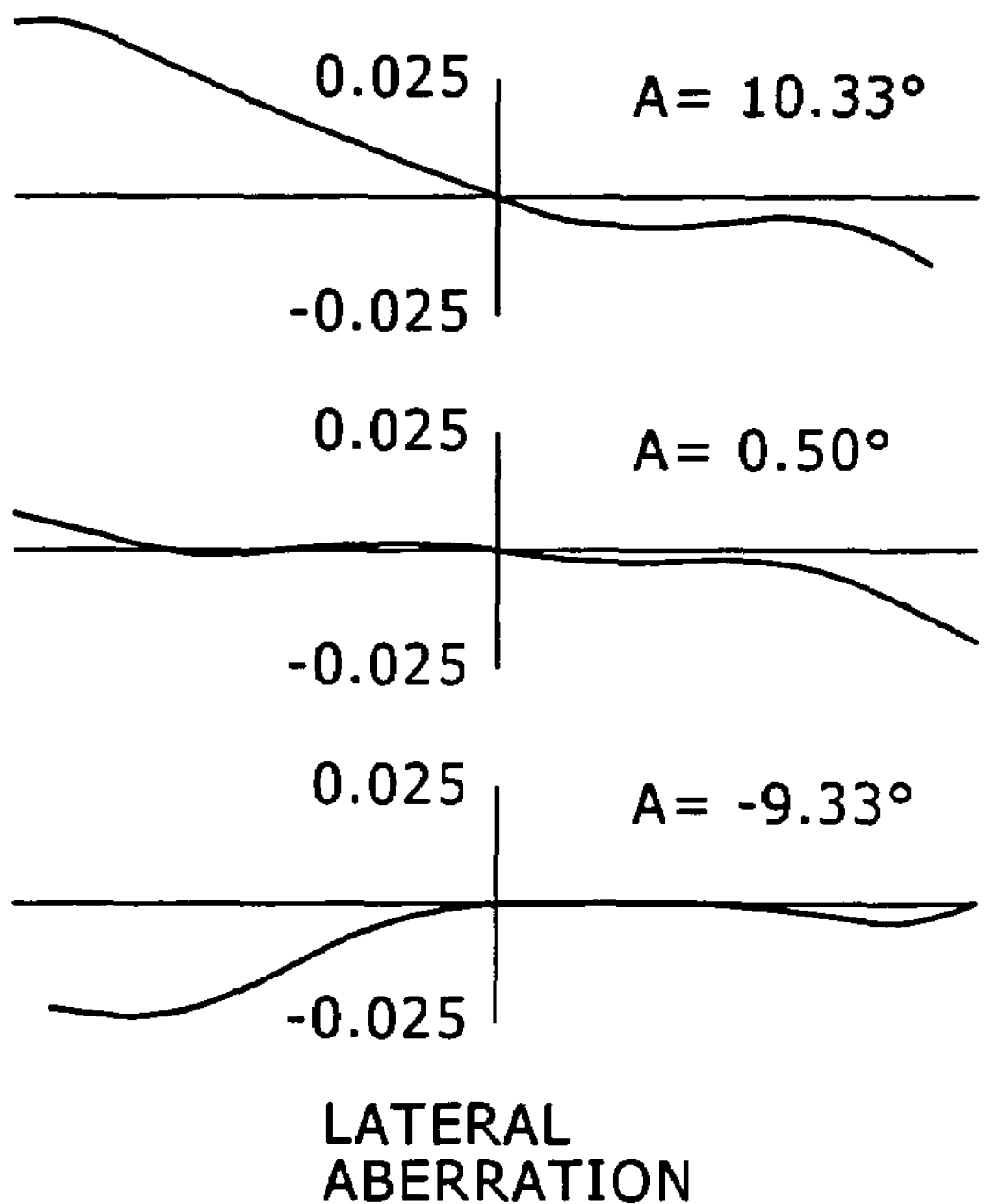
FIG. 12 shows lateral aberration in a state in which image movement equivalent to 0.5 degrees in the telephoto end has been corrected.

FIGS. 11 and 12 severally shows lateral aberration diagrams when a plane glass 3 is inclined by an amount necessary for correcting the image movement of 0.5 degrees in the infinity focusing in the numerical value example 2. FIG. 11 shows the lateral aberration diagrams in the wide angle end (f=8.034), and FIG. 12 shows the lateral aberration diagrams in the telephoto end (f=26.480).

It is clear from each aberration diagram that in the numerical value example 2 various aberrations are well corrected, and that the numerical value example 2 has an excellent image formation performance.

Figure 13:
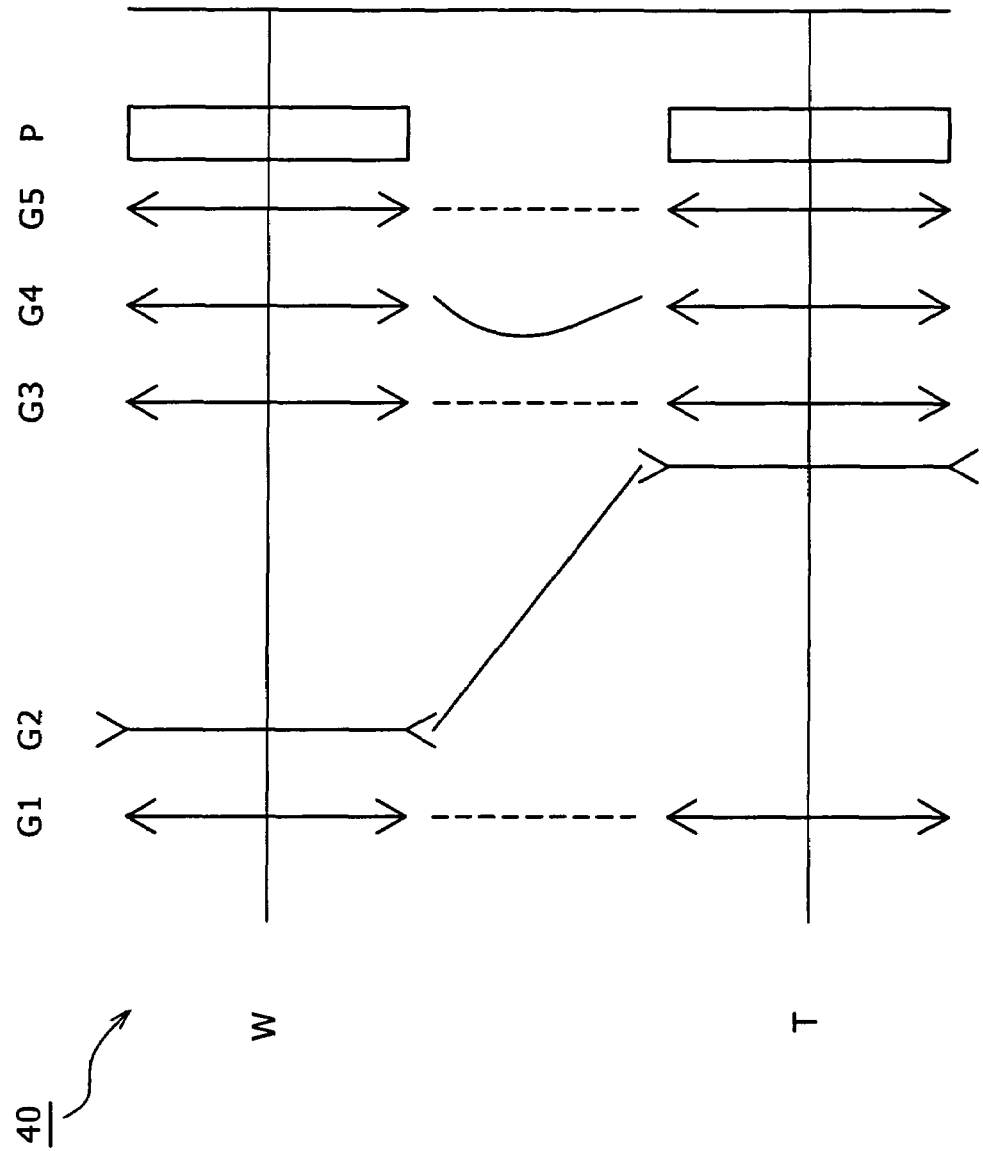
FIG. 13 is a diagram showing a refractive power arrangement of a third embodiment of the zoom lens of the present invention, the possibility of movement of each lens group at the time of zooming, and a locus of movement.

FIG. 13 shows a refractive power arrangement of a zoom lens 40 according to a third embodiment. A first lens group G1 having positive refractive power, a second lens group G2 having negative refractive power, a third lens group G3 having positive refractive power, a fourth lens group G4 having positive refractive power, a fifth lens group G5 having positive refractive power and a prism P are arranged to be configured in order from an object side. When the magnification is changed from a wide angle end to a telephoto end, the second lens group G2 moves to an image side so that the air space between the first lens group G1 and the second lens group G2 increases and the air space between the second lens group G2 and the third lens group G3 decreases. At this time, the first lens group G1, the third lens group G3, the fifth lens group G5 and the prism P are fixed, and the fourth lens group G4 moves in order to correct a change of an image plane position accompanying the movement of the second lens group G2. The fourth lens group G4 moves to the object side at the time of a short distance focusing.

FIG. 14 is a view showing the lens configuration of the zoom lens 40 according to the third embodiment, and each lens group is configured as follows.

The first lens group G1 includes cemented lens L11 of a negative lens having a convex surface facing the object side and being shaped in the meniscus form, and a positive lens having a convex surface facing the object side; and a positive lens L12 having a convex surface facing the object side. The second lens group G2 includes a negative lens L21 having a concave surface facing the image side and being formed in the meniscus form, and a cemented lens L22 of a negative lens formed in a biconcave form and a positive lens having a convex surface facing the object side and being formed in the meniscus form. The third lens group G3 includes a positive lens L3 formed in a biconvex form. The fourth lens group G4 includes a cemented positive lens L4 of a positive lens formed in a biconvex form and a negative lens having a concave surface facing the object side and being formed in the meniscus form. The fifth lens group G5 includes a negative lens L51 having a concave surface facing the image side and being formed in the meniscus form, and a biconvex lens L51. The prism P is designated by numeral 8 and has a structure shown in FIGS. 21 and 22.

In addition, an aperture diaphragm S is disposed at a position near to the object side of the third lens group G3, and is fixed when changing the magnification.

Table 11 shows the values of the specifications of the numerical value example 3 in which concrete numerical values are applied to the third embodiment.

TABLE 11

| f | 8.14~38.32 |
| --- | --- |
| FN0 | 2.88~3.24 |
| 2ω | 60.60~13.27° |

| SURFACE NUMBER | RADIUS OF CURVATURE | SURFACE INTERVAL | REFRACTION INDEX | ABBE NUMBER | |
| --- | --- | --- | --- | --- | --- |
| 1: | 58.0469 | 1.200 | 1.92286 | 20.9 | |
| 2: | 31.8566 | 3.472 | 1.77250 | 49.6 | |
| 3: | 385.6446 | 0.200 | | | |
| 4: | 26.5423 | 2.557 | 1.69680 | 55.3 | |
| 5: | 72.1279 | (D5) | | | |
| 6: | 72.1279 | 0.600 | 1.88300 | 40.8 | |
| 7: | 7.7200 | 4.387 | | | |
| 8: | −31.7152 | 0.500 | 1.49700 | 81.6 | |
| 9: | 9.1943 | 2.299 | 1.90366 | 31.1 | |
| 10: | 30.4291 | (D10) | | | (APERTURE |
| 11: | 0.0000 | 4.000 | | | DIAPHRAGM) |
| 12: | 85.6791 | 1.335 | 1.76802 | 49.3 | |
| 13: | −43.0892 | (D13) | | | |
| 14: | 33.2563 | 2.706 | 1.49700 | 81.6 | |
| 15: | −14.3230 | 0.500 | 1.94595 | 18.0 | |
| 16: | −19.0368 | (D16) | | | |
| 17: | 36.0011 | 0.500 | 1.94595 | 18.0 | |
| 18: | 25.0000 | 2.546 | | | |
| 19: | 100.0000 | 1.249 | 1.62041 | 60.3 | |
| 20: | −30.7532 | 1.000 | | | |
| 21: | 0.0000 | 0.800 | 1.51680 | 64.2 | |
| 22: | 15.0000 | 0.200 | 1.51341 | 61.2 | |
| 23: | 15.0000 | 3.000 | 1.51680 | 64.2 | |
| 24: | 0.0000 | (Bf) | | | |

The $12^{th}$ surface and $20^{th}$ surface are formed as aspherical surfaces. Then, the $4^{th}$, the $6^{th}$, the $8^{th}$ and the $10^{th}$ aspherical surface coefficients A, B, C and D of these surfaces in the numerical value example 3 are shown in Table 12 together with the conical constants κ.

TABLE 12

| 12TH SURFACE | κ = −2.195038 A = −0.328381E−04 B = +0.772945E−06 C = −0.452069E−07 D = +0.749312E−09 |
| --- | --- |
| 20TH SURFACE | κ = 0.000000 A = +0.512475E−04 B = −0.870496E−06 C = +0.335183E−07 D = −0.418081E−09 |

When the lens position arrangement changes from the wide angle end to the telephoto end, a surface interval D5 between the first lens group G1 and the second lens group G2, a surface interval D10 between the second lens group G2 and the aperture diaphragm S, a surface interval D13 between the third lens group G3 and the fourth lens group G4, and a surface interval D16 between the fourth lens group G4 and the fifth lens group G5 change. Accordingly, each of the surface intervals mentioned above and back-foci BF in the wide angle end sate (f=8.143) and the telephoto end (f=38.317) in the numerical value example 3 are shown in Table 13.

TABLE 13

(VARIABLE INTERVAL TABLE)

| f | 8.143 | 38.317 |
| --- | --- | --- |
| D5 | 0.900 | 17.980 |
| D10 | 18.881 | 1.801 |
| D13 | 11.469 | 6.016 |
| D16 | 3.865 | 9.288 |
| Bf | 12.132 | 12.132 |

A corresponding value of each of the conditional expressions (1)-(3) in the numerical value example 3 is shown in Table 14.

TABLE 14

| φb = 0.051 |
| --- |
| Ymax = 4.55 |

| (1) | φb/φ = 0.415 |
| --- | --- |
| (2) | Bf · FN0/Ymax = 8.639 |
| (3) | Ds/TL = 0.564 |

The apex angles of the prism 1 necessary for correcting the image movement of 0.5 degrees in the wide angle end and the telephoto end of the numerical value example 3 are shown in Table 15.

TABLE 15

| INCLINATION ANGLE AT CORRECTION OF 0.5 DEGREES | |
| --- | --- |
| WIDE | 0.649 DEGREES |
| TELE | 3.06 DEGREES |

Figure 15:
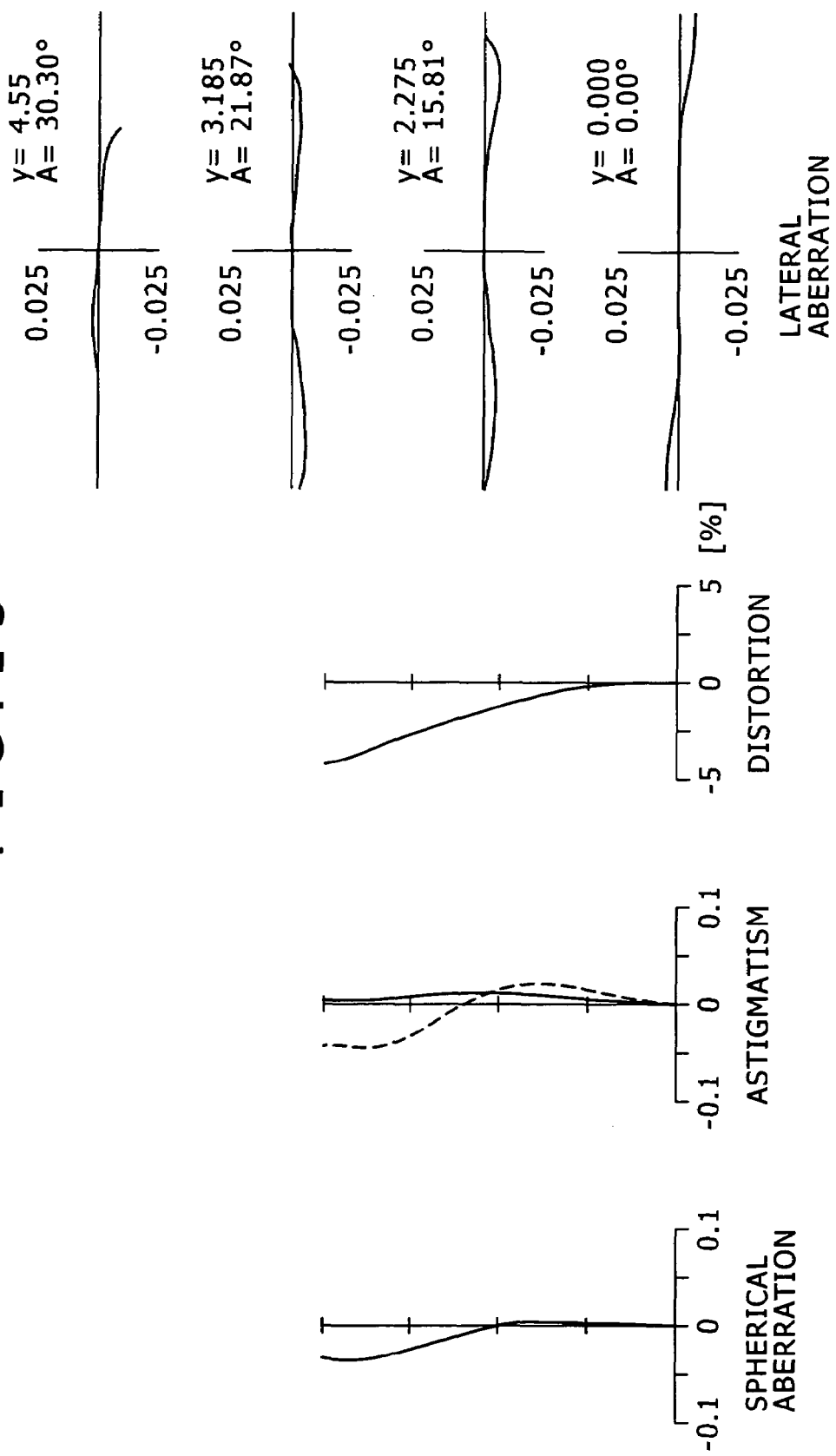
FIG. 15 shows various aberration diagrams of a numerical value example 3 in which concrete numerical values are applied to the third embodiment together with FIGS. 16-18, and the present diagram shows spherical aberration, astigmatism, distortion and lateral aberration in a wide angle end.
Figure 16:
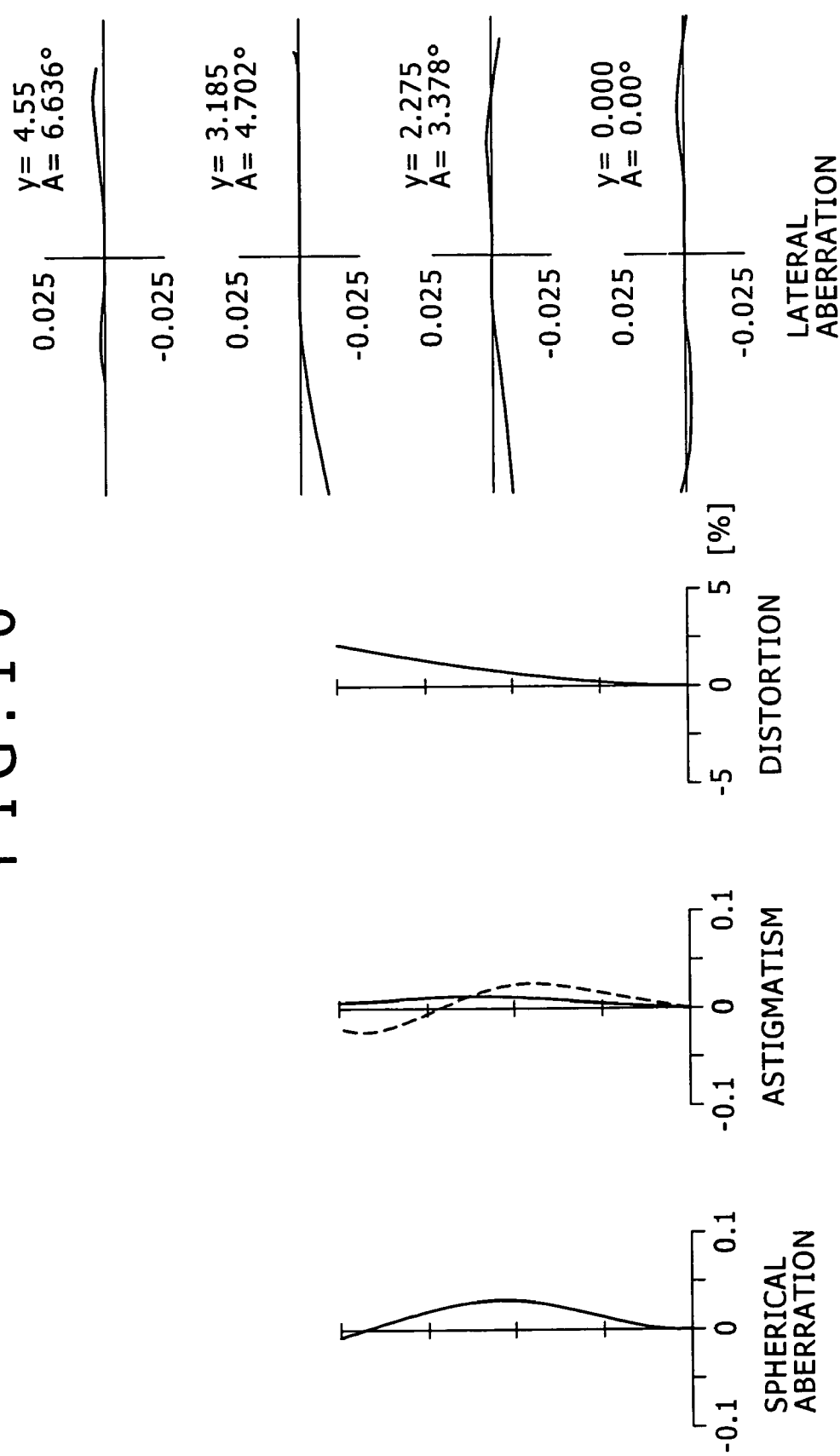
FIG. 16 shows spherical aberration, astigmatism, distortion and lateral aberration in a telephoto end.

FIGS. 15 and 16 severally show various aberration diagrams of the numerical value example 3 in the state of infinity focusing. FIG. 15 shows the various aberration diagrams at the wide angle end (f=8.143), and FIG. 16 shows the various aberration diagrams at the telephoto end (f=38.317).

In each aberration diagram in FIGS. 15 and 16, a solid line in the spherical aberration diagram expresses a spherical aberration, a solid line in the astigmatism diagram expresses a sagittal image plane, and a broken line in the astigmatism diagram expresses a meridional image plane. In each of the lateral aberration diagrams, A indicates a half-angle of view, and y indicates an image height.

Figure 17:
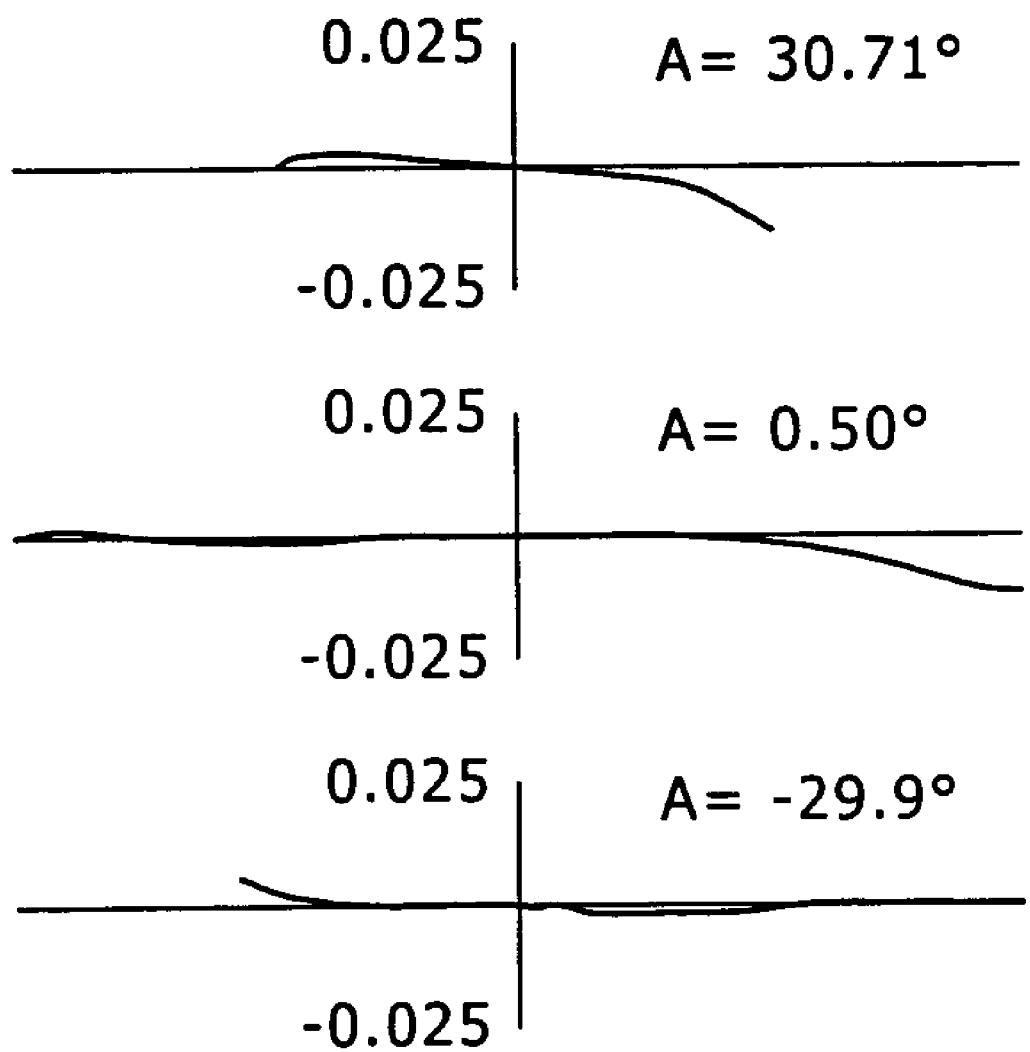
FIG. 17 shows lateral aberration in a state in which image movement equivalent to 0.5 degrees in the wide angle end has been corrected.
Figure 18:
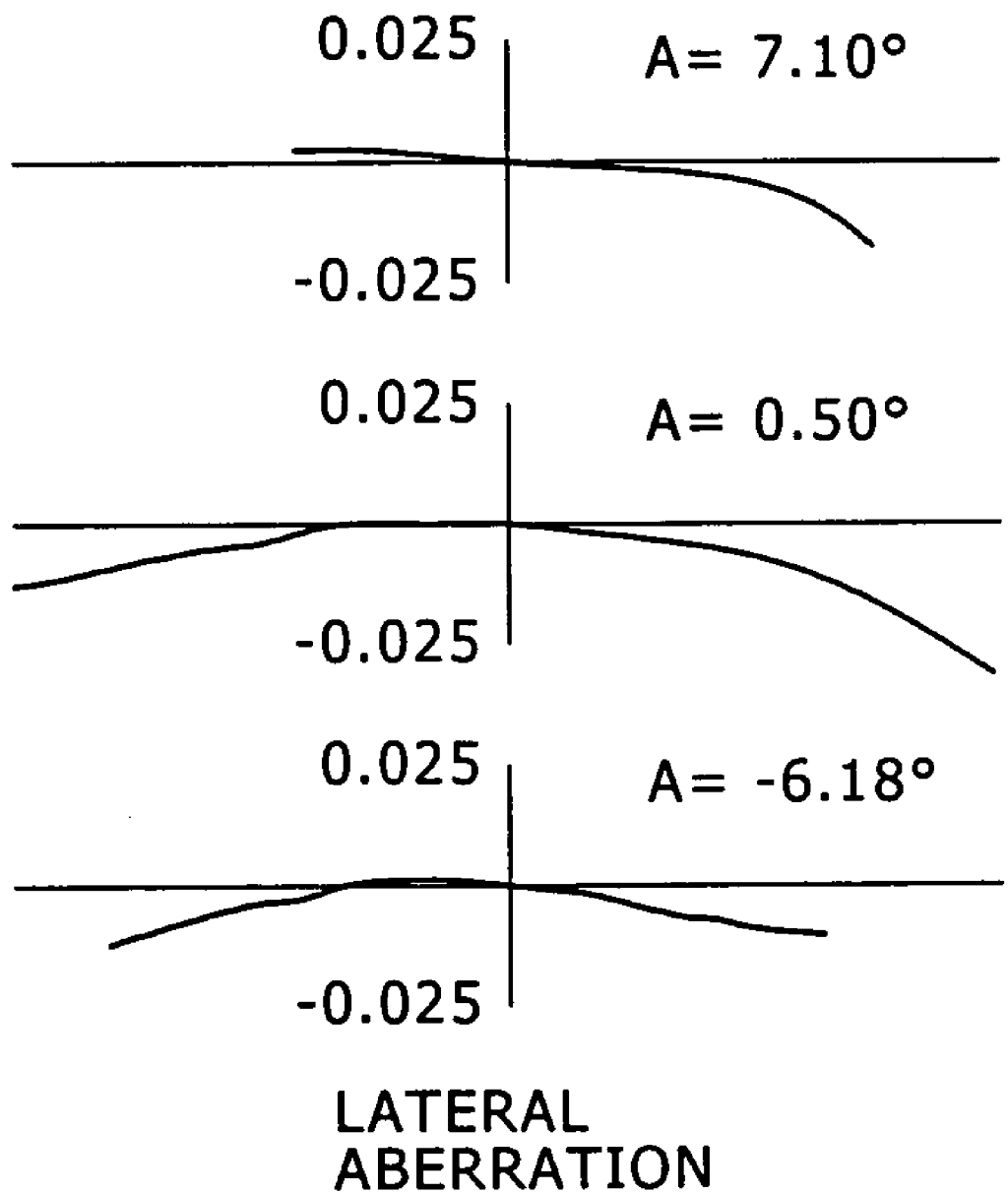
FIG. 18 shows lateral aberration in a state in which image movement equivalent to 0.5 degrees in the telephoto end has been corrected.

FIGS. 17 and 18 severally shows lateral aberration diagrams when the convex-plane lens 10 is inclined by an amount necessary for correcting the image movement of 0.5 degrees in the infinity focusing in the numerical value example 3. FIG. 17 shows the lateral aberration diagrams in the wide angle end (f=8.143), and FIG. 18 shows the lateral aberration diagrams in the telephoto end (f=38.317).

It is clear from each aberration diagram that in the numerical value example 3 various aberrations are well corrected, and that the numerical value example 3 has an excellent image formation performance.

Figure 23:
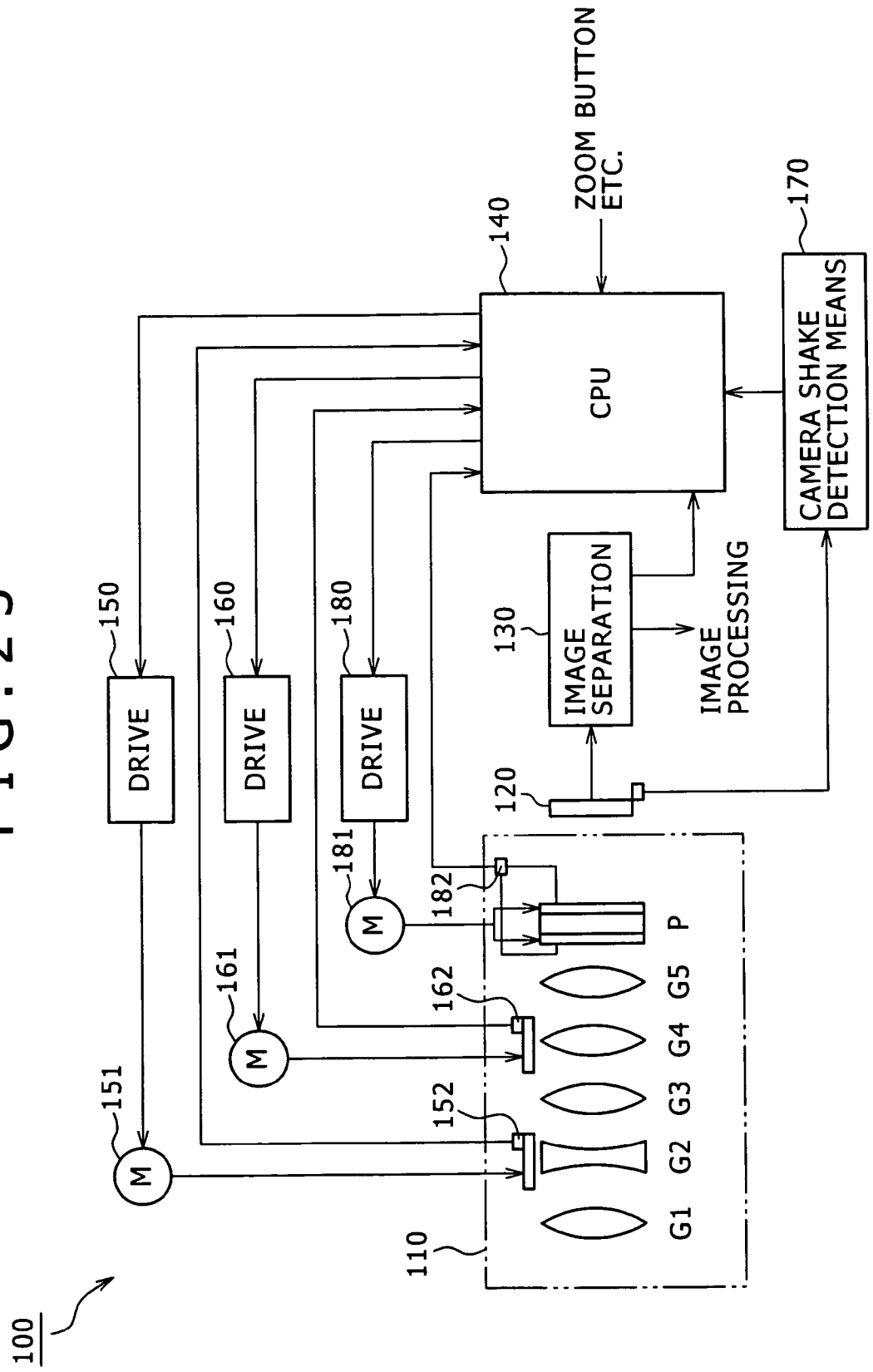
FIG. 23 is a block diagram showing an embodiment of the imaging apparatus of the present invention.

FIG. 23 shows an imaging apparatus according to an embodiment of the present invention.

An imaging apparatus 100 includes a zoom lens 110, and an imaging device 120 which converts an optical image formed by the zoom lens 110 into an electric signal. As the imaging device 120, one using, for example, a photoelectric conversion device such as a charge coupled device (CCD), a complementary metal-oxide semiconductor (CMOS) or the like can be used. The present embodiment can be applied to the zoom lens 110, and the lens groups of the zoom lens 20 shown in FIG. 2 according to the first embodiment are shown in FIG. 23, in which the lens group is simplified to a single lens. It is needless to say, that not only the zoom lens 20 according to the first embodiment but also the zoom lenses 30 and 40 according to the second and the third embodiments, respectively, and the zoom lenses of the present invention configured in forms other than those of the embodiments shown in the present specification can be used.

The electric signal formed by the imaging device 120 is separated by an image separation circuit 130. A signal for focus control is transmitted to a control circuit 140, and a signal for an image is transmitted to an image processing circuit. The signal transmitted to the image processing circuit is processed into a form suitable for the post-processing, and is supplied to various pieces of processing such as a display by a display apparatus, recording to a recording medium, transfer by communication means and the like.

An operation signal from the outside, such as an operation of, for example, a zoom button, is input into the control circuit 140, and various pieces processing is performed according to the operation signal. For example, when a zooming instruction by the zoom button is input, drive units 151 and 161 are operated through driver circuits 150 and 160 in order to set the zoom lens 110 in focus distance sate based on the instruction, and each of the lens groups G2 and G4 are moved to predetermined positions. The position information of each of the lens groups G2 and G4 acquired by each of the sensors 152 and 162, respectively, is input into the control circuit 140, and is referred to when the instruction signal is output to the driver circuits 150 and 160. Moreover, the control circuit 140 checks the focus state based on the signal transmitted from the image separation circuit 130, and operates the drive unit 161 through the driver circuit 160 to perform the position control of the fourth lens group G4 in order to acquire the optimum focus state.

The imaging apparatus 100 is provided with a camera shake correction function. For example, when camera shake detection means 170 such as a gyro sensor detects a movement of the imaging device 120 cause by a depression of the shutter release button, a signal from the camera shake detection means 170 is input into the control circuit 140, and an apex angle of the prism 1 for compensating the movement of an image by the movement is calculated in the control circuit 140. A drive unit 180 is operated through a driver circuit 180 in order to incline the parallel flat plates 2 and/or 3 of the prism 1, and the parallel flat plates 2 and/or 3 are inclined by a predetermined angle. The inclination angles of the parallel flat plates 2 and 3 are detected by a sensor 182, and the inclination angle information of the parallel flat plates 2 and 3 acquired by the sensor 182 is input into the control circuit 140 to be referred to at the time of sending an instruction signal to the driver circuit 180.

As a concrete product, the imaging apparatus 100 can take various kinds of forms. For example, the imaging apparatus 100 can be widely applied as a camera unit or the like of digital input output equipment such as a digital still camera, a digital video camera, a cellular phone in which a camera is incorporated, a personal digital assistant (PDA) in which a camera is incorporated, and the like.

In addition, any of the concrete form of each unit and numerical values of each of the embodiments and the numerical value examples described above are shown as only examples of the materialization performed at the time of implementing the present invention, and the scope of the present invention should not be interpreted to be limited to those concrete examples.

The present application contains subject matter related to Japanese Patent Applications JP 2005-312541 filed in the Japanese Patent Office on Oct. 27, 2005, the entire contents of which being incorporated herein by reference.

What is claimed is:

1. A zoom lens comprising:
a varifocal lens unit having a plurality of movable lens groups, and
a prism disposed on an image side of the varifocal lens unit,
wherein the prism has an incident plane on which a light flux from the varifocal lens unit enters, and an exit plane from which the light flux is emitted toward an image plane, and is configured such that the incident plane or the exit plane or both planes can be inclined with respect to an optical axis, whereby a field of view is shifted by a predetermined amount by inclining the plane;
wherein the varifocal lens unit includes a front side lens group, an aperture diaphragm and a rear side lens group, which are arranged in order from an object side, and following conditional expressions (1) and (2) are satisfied:

$$0.25 < \phi b/\phi < 0.8 \tag{1}$$

$$3 < Bf \cdot FNO/Y\max \tag{2}$$

where
$\phi b$: refractive power of the rear side lens group in a wide angle end,
$\phi$: refractive power of whole zoom lens in the wide angle end,
Bf: distance from the exit plane to the image plane of the prism in a telephoto end along the optical axis,
FNO: F number in the telephoto end for the entire varifocal lens unit,
Ymax: maximum image height, and
Bf and Ymax have the same units of measure.

2. The zoom lens according to claim 1, wherein both of the front side lens group and the rear side lens group severally includes at least one lens group which is movable when a lens position arrangement changes from the wide angle end to the telephoto end, and a following conditional expression (3) is satisfied:

$$0.4 < Ds/TL < 0.7 \quad (3)$$

where

Ds: distance from the aperture diaphragm to the image plane along the optical axis in the wide angle end, TL: distance from a lens surface at a position nearest to the object side to the image plane of the zoom lens in the wide angle end along the optical axis, and Ds and TL have the same units of measure.

3. The zoom lens according to claim 1 or 2, wherein the prism includes a first parallel flat plate, a liquid and a second parallel flat plate, which are located in order from the object side, and wherein an object side lens surface of the first parallel flat plate forms the incident plane, and an image side lens surface of the second parallel flat plate forms the exit plane.

4. The zoom lens according to claim 1 or 2, wherein the prism includes a first lens and a second lens, which are located in order from the object side, wherein an object side lens surface of the first lens is a plane forming the incident plane, and an image side lens surface of the second lens forms the exit plane, and wherein an image side lens surface of the first lens and an object side lens surface of the second lens are curved surfaces having a same radius of curvature, the curved surfaces slidably contacted with each other directly or with a friction reducing medium put between them.

5. An imaging apparatus comprising:

a zoom lens;

an imaging device adapted to convert an optical image formed by the zoom lens into an electric signal;

camera shake detection means for detecting a movement of the imaging device;

camera shake control means for calculating a movement correction angle for correcting an image blur caused by the movement of the imaging device detected by the camera shake detection means and sending a correction signal for setting the zoom lens to a predetermined state in which a field of view is shifted by an amount corresponding to the movement correction angle; and a camera shake drive unit adapted to set the zoom lens into the predetermined state based on the correction signal;

wherein the zoom lens includes a varifocal lens unit having a plurality of movable lens groups, and a prism disposed on an image side of the varifocal lens unit;

wherein the prism has an incident plane on which a light flux from the varifocal lens unit enters, and an exit plane from which the light flux is emitted toward an image plane, and is configured such that the incident plane or the exit plane or both planes can be inclined with respect to an optical axis, whereby a field of view is shifted by a predetermined amount by inclining the plane;

wherein the varifocal lens unit includes a front side lens group, an aperture diaphragm and a rear side lens group, which are arranged in order from an object side, and following conditional expressions (1) and (2) are satisfied:

$$0.25 < \phi b/\phi < 0.8 \quad (1)$$

$$3 < Bf \cdot FNO/Y\text{max} \quad (2)$$

where $\phi b$: refractive power of the rear side lens group in a wide angle end, $\phi$: refractive power of whole zoom lens in the wide angle end, Bf: distance from the exit plane to the image plane of the prism in a telephoto end along the optical axis, FNO: F number in the telephoto end for the entire varifocal lens unit, Ymax: maximum image height, and Bf and Ymax have the same units of measure.

6. An imaging apparatus comprising:

a zoom lens;

an imaging device adapted to convert an optical image formed by the zoom lens into an electric signal;

a camera shake detector adapted to detect a movement of the imaging device;

a camera shake controller adapted to calculate a movement correction angle for correcting an image blur caused by the movement of the imaging device detected by the camera shake detector and sending a correction signal for setting the zoom lens to a predetermined state in which a field of view is shifted by an amount corresponding to the movement correction angle; and a camera shake drive unit adapted to set the zoom lens into the predetermined state based on the correction signal;

wherein the zoom lens includes a varifocal lens unit having a plurality of movable lens groups, and a prism disposed on an image side of the varifocal lens unit;

wherein the prism has an incident plane on which a light flux from the varifocal lens unit enters, and an exit plane from which the light flux is emitted toward an image plane, and is configured such that at least one of the incident plane and the exit plane can be inclined with respect to an optical axis, whereby a field of view is shifted by a predetermined amount by inclining the plane;

wherein the varifocal lens unit includes a front side lens group, an aperture diaphragm and a rear side lens group, which are arranged in order from an object side, and following conditional expressions (1) and (2) are satisfied:

$$0.25 < \phi b/\phi < 0.8 \quad (1)$$

$$3 < Bf \cdot FNO/Y\text{max} \quad (2)$$

where $\phi b$: refractive power of the rear side lens group in a wide angle end, $\phi$: refractive power of whole zoom lens in the wide angle end, Bf: distance from the exit plane to the image plane of the prism in a telephoto end along the optical axis, FNO: F number in the telephoto end for the entire varifocal lens unit, Ymax: maximum image height, and Bf and Ymax have the same units of measure.

* * * * *